United States Patent
Gorishek, IV et al.

(10) Patent No.: US 6,480,952 B2
(45) Date of Patent: Nov. 12, 2002

(54) EMULATION COPROCESSOR

(75) Inventors: Frank J. Gorishek, IV; Charles R. Boswell, Jr., both of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/085,187

(22) Filed: May 26, 1998

(65) Prior Publication Data

US 2002/0013892 A1 Jan. 31, 2002

(51) Int. Cl.[7] ............................ G06F 9/455; G06F 9/54; G06F 13/38
(52) U.S. Cl. ....................... 712/227; 712/36; 712/209; 703/26; 703/27; 709/319; 709/328
(58) Field of Search ......................... 712/41, 208, 233, 712/23, 36, 31, 209, 212, 34, 227; 711/119, 121–143, 146; 709/208, 330, 329, 328, 319; 710/127, 128, 129, 101, 137, 130, 5, 55, 131, 150; 703/23, 26, 27, 29; 361/183; 717/5

(56) References Cited

U.S. PATENT DOCUMENTS

| | | | |
|---|---|---|---|
| 4,799,150 A | 1/1989 | Bui | 710/130 |
| 4,954,949 A | 9/1990 | Rubin | 710/101 |
| 5,077,657 A | 12/1991 | Cooper et al. | 703/26 |
| 5,574,927 A | 11/1996 | Scantlin | 712/41 |
| 5,638,525 A | 6/1997 | Hammond et al. | 712/209 |
| 5,659,709 A | 8/1997 | Quach | 711/146 |
| 5,666,519 A * | 9/1997 | Hayden | 703/23 |
| 5,717,898 A | 2/1998 | Kagan et al. | 711/145 |
| 5,764,934 A | 6/1998 | Fisch et al. | 710/129 |

(List continued on next page.)

FOREIGN PATENT DOCUMENTS

| | | |
|---|---|---|
| EP | 0 230 353 | 7/1987 |
| EP | 0 455 345 | 11/1991 |
| EP | 0 617 376 | 9/1994 |
| EP | 0 671 685 A2 | 2/1995 |
| EP | 0 817 096 | 1/1998 |
| GB | 2 278 214 | 11/1994 |
| WO | 93/16437 | 8/1993 |

OTHER PUBLICATIONS

BYTE Magazine, "Why the 615 Matters", Linley Gwennap, 1995, pp. 198–200.
BYTE Magazine, "An Alpha in PC Clothing", Tom Thompson, Feb. 1996, pp. 1–6.
BYTE Magazine, "Alpha Learns to Do Windows", Selinda Chiquoine, Oct. 1996, pp. 1–3.

(List continued on next page.)

Primary Examiner—Daniel H. Pan
(74) Attorney, Agent, or Firm—Conley, Rose & Tayon, PC; Lawrence J. Merkel

(57) ABSTRACT

A computer system employing a host processor and an emulation coprocessor. The host processor includes hardware configured to execute instructions defined by a host instruction set architecture, while the emulation coprocessor includes hardware configured to execute instructions defined by a different instruction set architecture from the host instruction set architecture ("the foreign instruction set architecture"). The host processor core executes operating system code as well as application programs which are coded in the host instruction set architecture. Upon initiation of a foreign application program, the host processor core communicates with the emulation coprocessor core to cause the emulation coprocessor core to execute the foreign application program. Accordingly, application programs coded according to the foreign instruction set architecture can be executed directly in hardware. The computer system may be characterized as a heterogeneous multiprocessing system. While the emulation coprocessor is executing the foreign application program, the host processor may execute operating system routines unrelated to the foreign application program or may execute a host application program.

20 Claims, 15 Drawing Sheets

U.S. PATENT DOCUMENTS

| | | | | |
|---|---|---|---|---|
| 5,802,373 | A | * | 9/1998 | Yates et al. ............... 717/5 |
| 5,819,105 | A | | 10/1998 | Moriarty et al. ............... 710/5 |
| 5,802,577 | A | | 6/1999 | Bhat et al. ............... 711/146 |
| 5,909,559 | A | | 6/1999 | So ............... 710/127 |
| 5,923,892 | A | | 7/1999 | Levy ............... 712/31 |
| 5,925,123 | A | | 7/1999 | Tremblay et al. ............... 712/212 |
| 6,026,238 | A | | 2/2000 | Bond et al. ............... 709/528 |
| 6,275,938 | B1 | | 8/2001 | Bond et al. ............... 713/200 |
| 6,308,255 | B1 | | 10/2001 | Gorisheck, IV, et al. ... 712/209 |

OTHER PUBLICATIONS

Microsoft Windows NT Workstation, "Windows(r) x86 Technology Preview", Microsoft Corporation, 1997, pp. 1.

AMD, "AMD–K6 Processor Data Sheet", Chpt.1 & 2, Mar. 1998, pp. 1–20.

Digital Equipment Corp., Maynard Massachusetts, "Digital Semiconductor 21172 Core Logic Chipset", Technical Reference Manual, Apr. 1996, pp. 1–1 to 1–7.

Readwx86, "Win32 x86 Emulation on Risc (Wx86)", pp.2.

AMD Tech Law "Intel Reveals how Merced with be x86–Compatible", Alexander Wolfe, Santa Clara, CA, May 8, 1998, pp. 2.

AMD, "AMD5$_k$ 86™ Processor", Technical Reference Manual, Chpts. 1 & 2, pp. 1–1 to 1–3 and 2–1 to 2–12.

"Press Release", Undated: Jun. 25, 1997, downloaded from: digital.com/info/PR00UM and www.zdnet.com/cshopper/content/9704/cshp0039.html on Dec. 11, 1997, (7 sheets).

Digital, "Digital FX!32", Updated: Sep. 26, 1997, downloaded from digital.com/semiconductor/amt/fx32/fx–white.html on Jan. 26, 1998, pp. 1–4.

Orange Micro, Inc., "Product Information", downloaded from orangemicro.com.page2.html on Aug. 4, 1998, (6 sheets).

* cited by examiner

| Command | Function |
|---|---|
| Read Registers | Read One or More Emulation Coprocessor Registers |
| Write Registers | Write One or More Emulation Coprocessor Registers |
| Go | Begin Execution at Execution Pointer Stored in Program Counter |
| Stop | Inform Host that Emulation Coprocessor Has Stopped (Includes Reason for Stopping) |

EMULATION COPROCESSOR

BACKGROUND OF THE INVENTION

1. Field of the Invention

This invention is related to the field of processors for computer systems and, more particularly, to supporting multiple instruction set architectures within a computer system.

2. Description of the Related Art

Computer systems have become an important productivity tool in many environments. Nearly all lines of work benefit from a computer system to carry out many tasks which are central to that work. For example, managerial professionals use computer systems for managing data bases of business-critical data, creating and managing documents, etc. Engineering professionals use computer systems for researching, designing, and verifying products. Manufacturing and distribution centers use computer systems to control manufacturing machines, to track products through the manufacturing process, for inventory control, and to manage distribution products to wholesale/retail centers. All of the above may use computer systems for communications as well via email, the Internet, intranets, etc. Home uses for computer systems abound as well, including financial management, communication, and entertainment. Many other uses for computer systems exist.

As the above illustrates, a large diverse set of uses for computer systems have been developed. Generally, these uses are supported by a variety of application programs designed to execute under an operating system provided for the computer system. The operating system provides an interface between the application programs and the computer system hardware. Each computer system may have a variety of differences in hardware configuration (e.g. amount of memory, number and type of input/output (I/O) devices, etc.). The operating system insulates the application program from the hardware differences. Accordingly, the application program may often times be designed without regard for the exact hardware configuration upon which the application program is to execute. Additionally, the operating system provides a variety of low level services which many different types of application programs may need, allowing the application programs to rely on the operating system services instead of programming these services internal to the application program. Generally, the operating system provides scheduling of tasks (e.g. different application programs which may be operating concurrently), management and allocation of system resources such as I/O devices and memory, error handling (e.g. an application program operating erroneously), etc. Examples of operating systems are the Windows operating system (including Windows 95 and Windows NT), UNIX, DOS, and MAC-OS, among others. Conversely, an application program provides specific user functionality to accomplish a specific user task. Word processors, spreadsheets, graphics design programs, inventory management programs, etc. are examples of application programs.

Therefore, application programs are typically designed to operate upon a particular operating system. The services available from the operating system ("operating system routines") are optionally used by the application program. Additionally, the application program conforms to the requirements of the operating system.

One hardware feature which the operating system does not typically insulate the application program from is the instruction set architecture of the processors within the computer system. Generally, an instruction set architecture defines the instructions which execute upon the processors, as well as processor resources directly used by the instructions (such as registers, etc.). The application program is generally compiled into a set of instructions defined by the instruction set architecture, and hence the operating system does not insulate the application program from this feature of the computer system hardware.

As described above, a computer system must support a large number of different types of application programs to be useful to a large base of customers. Processors employing newly developed instruction set architectures face a daunting task of enticing application developers to develop applications designed for the new instruction set architecture. However, without the application programs, the instruction set architecture and the processors designed therefor will often achieve only limited market acceptance, at best.

It is difficult and time consuming to recreate application programs using the new instruction set architecture due to the large number of application programs and the time and effort needed to "port" each application program to the new instruction set architecture. Furthermore, the source code for many application programs may be unavailable to those desiring to perform the port. On the other hand, operating systems are fewer in number (particularly those with widespread acceptance) and may be ported to a variety of instruction set architectures. For example, Windows NT has supported the Alpha architecture developed by Digital Equipment Corporation, the PowerPC architecture developed by IBM and Motorola, and the MIPS architecture, in addition to the x86 architecture.

In order to provide a large applications base, thereby generating market acceptance which may lead to more application programs being developed, a computer system based on processors employing the newly developed instruction set architecture may attempt to support applications coded to a different instruction set architecture. Herein, code using instructions defined by the instruction set architecture employed by the processors in a computer system is referred to as "native" or "host", while code using instructions defined by a different instruction set architecture is referred to as "nonnative" or "foreign".

The x86 architecture (also referred to as IA-32 or APX) has one of the largest application program bases in the history of computing. A large percentage of these programs are developed to run under the Windows operating system. While Windows and the x86 application programs are used periodically as an example herein, the techniques and hardware disclosed herein are not limited to this instruction set architecture and operating system. Any operating system and instruction set architecture may be used.

New computer systems, whose host processor is non-x86, may provide support for x86 (i.e. foreign) application programs running under the Windows operating system while application programs are developed for the non-x86 host processor. Two methods which have been used to support foreign applications in a computer system are software emulation and binary translation. Software emulation generally comprises reading each instruction in the application program as the instruction is selected for execution and performing an equivalent instruction sequence in the host architecture. Binary translation generally involves translating each instruction in the application program into an equivalent instruction sequence prior to executing the program, and then executing the translated program sequence.

Unfortunately, because each foreign instruction is examined during execution of the program, software emulation provides significantly reduced performance of the application program than that achievable on a computer system employing the foreign instruction set architecture. Furthermore, more memory is required to execute the application program, in order to store the emulation program and supporting data structures. If the application program includes real time features (e.g. audio and video), these features may operate poorly because of the excessive execution time. Still further, processor implementations of an instruction set architecture often include a variety of undocumented features (both known and unknown) which must be modeled by the software emulator. Furthermore, complex hardware features (such as the x86 floating point register stack) are difficult to model accurately in the software emulator.

Binary translation suffers from several drawbacks as well. Binary translation is not transparent to the user. Binary translation often requires multiple passes through the application program code to successfully translate the program. In the interim, software emulation may be used to execute the application (with many of the aforementioned drawbacks). Sometimes, a complete translation is not achieved, and hence software emulation is still required.

Several combinations of the above approaches have been employed by computer system companies and operating system companies. For example, Digital Equipment Corporation offers its FX!32 system and Microsoft offers its Wx86 extension to Windows NT. However, while these approaches have provided functionality, the high performance desired of the foreign applications has generally not been satisfied.

SUMMARY OF THE INVENTION

The problems outlined above are in large part solved by a computer system employing a host processor and an emulation coprocessor in accordance with the present invention. The host processor includes hardware configured to execute instructions defined by a host instruction set architecture, while the emulation coprocessor includes hardware configured to execute instructions defined by a different instruction set architecture from the host instruction set architecture ("the foreign instruction set architecture"). The host processor executes operating system code as well as application programs which are coded in the host instruction set architecture. Upon initiation of a foreign application program, the host processor communicates with the emulation coprocessor to cause the emulation coprocessor core to execute the foreign application program.

Advantageously, application programs coded according to the foreign instruction set architecture can be executed directly in hardware. Execution performance of the application program may be substantially greater than that of a software emulation or binary translation methodology. Moreover, execution performance may be substantially similar to execution performance of the application program within a computer system based upon a processor employing the foreign instruction set architecture, thereby preserving much of the real-time behavior of the foreign application program. Software emulation/binary translation methodologies and combinations thereof may be eliminated in favor of hardware execution of the foreign application program. Because the emulation coprocessor includes hardware functionality for executing the foreign instruction set architecture, the difficulties of accurate architecture modeling may be eliminated. The combination of these various advantages may provide a high level performance, allowing the foreign application execution performance to be highly acceptable to a user. Accordingly, market acceptance of the computer system based upon the host instruction set architecture may be increased. As market acceptance increases, the number of application programs coded for the host instruction set architecture may increase as well. Long-term success and viability of the host instruction set architecture may therefore be more likely.

Providing hardware functionality for the foreign instruction set architecture within the computer system generates additional advantages. In particular, the computer system may be characterized as a heterogeneous multiprocessing system. While the emulation coprocessor is executing the foreign application program, the host processor may execute operating system routines unrelated to the foreign application program or may execute a host application program. Advantageously, the computer system may achieve a substantially higher throughput on both host and foreign code that would be achievable via computer system employing only the host processor and software emulation/binary translation for the foreign instruction set architecture.

Broadly speaking, the present invention contemplates an apparatus for a computer system comprising a first processor and a second processor. The first processor is configured to execute first instructions defined by a first instruction set architecture. An operating system employed by the computer system is coded using the first instructions. Coupled to the first processor, the second processor is configured to execute second instructions defined by a second instruction set architecture different than the first instruction set architecture. An application program designed to execute within the operating system is coded using the second instructions. The second processor is configured to execute the application program while the first processor is configured to execute the operating system. Additionally, the second processor is configured to communicate with the first processor upon detecting a use of an operating system routine for the application program.

The present invention farther contemplates a heterogeneous multiprocessing system comprising a first processor, a second process, an operating system, and an application program. The first processor is configured to execute first instructions defined by a first instruction set architecture. The second processor is coupled to the first processor, and is configured to execute second instructions defined by a second instruction set architecture different than the first instruction set architecture. The operating system is coded using the first instructions, while the application program is coded using the second instructions and designed to execute within the operating system. The second processor is configured to execute the application program and the first processor is configured to concurrently execute a process unrelated to the application program.

Moreover, the present invention contemplates a method for executing an application program coded using instructions from a first instruction set architecture and designed to execute within an operating system coded using instructions from a second instruction set architecture different from the first instruction set architecture. Initiation of the application program is detected by the operating system executing upon a first processor configured to execute instructions from the second instruction set architecture. A context for the application program is established in a second processor configured to execute instructions from the first instruction set architecture. The application program is executed upon the second processor.

BRIEF DESCRIPTION OF THE DRAWINGS

Other objects and advantages of the invention will become apparent upon reading the following detailed description and upon reference to the accompanying drawings in which:

FIG. 6 is a table illustrating communication commands according to one embodiment of the processor shown in FIG. 1.

Figure 1:
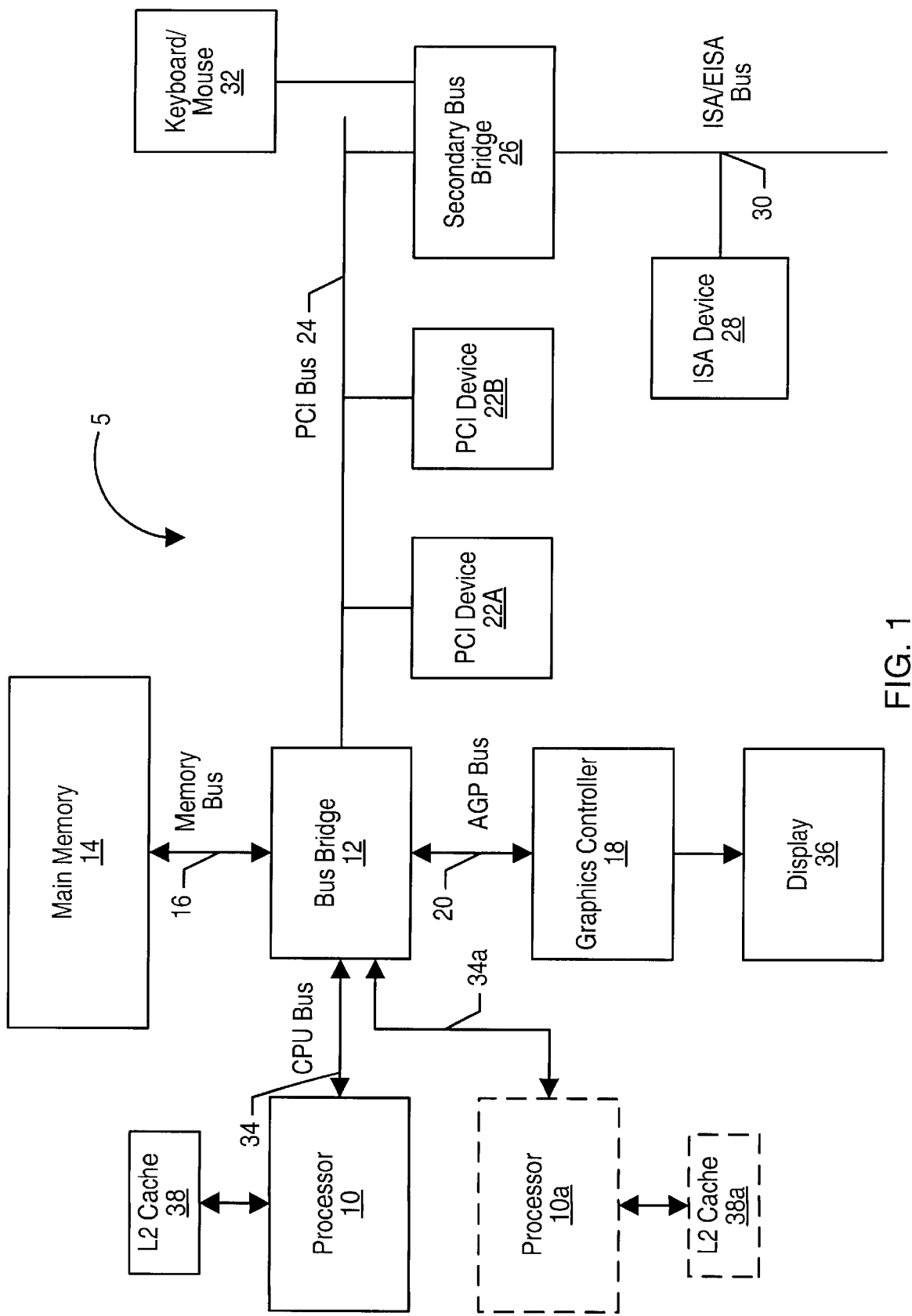
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 5 including a processor 10 coupled to a variety of system components through a bus bridge 12 is shown. Other embodiments are possible and contemplated. In the depicted system, a main memory 14 is coupled to bus bridge 12 through a memory bus 16, and a graphics controller 18 is coupled to bus bridge 12 through an AGP bus 20. Finally, a plurality of PCI devices 22A–22B are coupled to bus bridge 12 through a PCI bus 24. A secondary bus bridge 26 may further be provided to accommodate an electrical interface to one or more EISA or ISA devices 28 through an EISA/ISA bus 30. Processor 10 is coupled to bus bridge 12 through a CPU bus 34.

Generally speaking, processor 10 includes a host processor core and an emulation coprocessor core. The host processor core comprises hardware configured to execute instructions defined by a host instruction set architecture, while the emulation coprocessor core comprises hardware configured to execute instructions defined by a different instruction set architecture from the host instruction set architecture ("the foreign instruction set architecture"). The host processor core executes operating system code as well as application programs which are coded in the host instruction set architecture. Upon initiation of a foreign application program, the host processor core communicates with the emulation coprocessor core to cause the emulation coprocessor core to execute the foreign application program.

Advantageously, application programs coded according to the foreign instruction set architecture can be executed directly in hardware via processor 10. Execution performance of the application program may be substantially greater than that of a software emulation or binary translation methodology. Moreover, execution performance may be substantially similar to execution performance of the application program within a computer system based upon a processor employing the foreign instruction set architecture. Software emulation/binary translation methodologies and combinations thereof may be eliminated in favor of hardware execution of the foreign application program. Because processor 10 includes hardware functionality for executing the foreign instruction set architecture, the difficulties of accurate architecture modeling may be eliminated. Furthermore, since the foreign application program executes in a period of time similar to execution in a native computer system, much of the real-time behavior of the foreign application program may be preserved. The combination of these various advantages may provide a high level performance, allowing the foreign application execution performance to be highly acceptable to a user. Accordingly, market acceptance of the computer system based upon the host instruction set architecture may be increased. As market acceptance increases, the number of application programs coded for the host instruction set architecture may increase as well. Long-term success and viability of the host instruction set architecture may therefore be more likely.

Providing hardware functionality for the foreign instruction set architecture within computer system 5 generates additional advantages. In particular, computer system 5 may be characterized as a heterogeneous multiprocessing system. While the emulation coprocessor is executing the foreign application program, the host processor may execute operating system routines unrelated to the foreign application program or may execute a host application program. Advantageously, computer system 5 may achieve a substantially higher throughput on both host and foreign code that would be achievable via computer system employing only the host processor and software emulation/binary translation for the foreign instruction set architecture.

In one particular embodiment, the host instruction set architecture is the Alpha instruction set architecture developed by Digital Equipment Corporation and the foreign instruction set architecture is the x86 instruction set architecture. However, any instruction set architecture could be chosen as the host instruction set architecture. For example, the host instruction set architecture may be the PowerPC architecture, the IA–64 architecture developed by Intel, the MIPS architecture, the SPARC architecture, etc. Similarly, the foreign instruction set architecture may be chosen is any instruction set architecture other than the host instruction set architecture, including any of the examples listed above.

Figure 2:
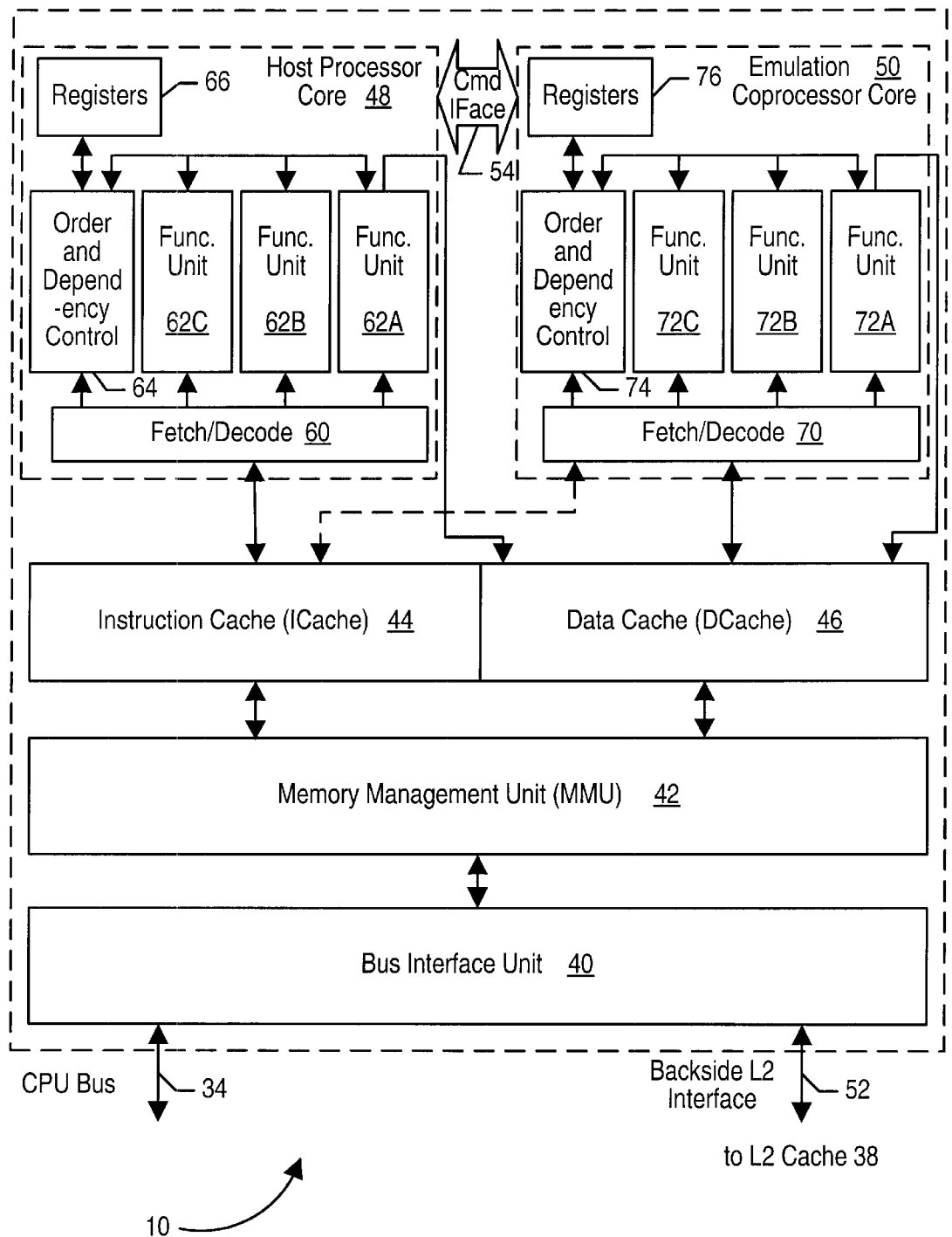
FIG. 2 is a block diagram of one embodiment of a processor shown in FIG. 1 including a host processor core and an emulation coprocessor core.

It is noted that several different embodiments of computer system 5 and processor 10 are shown herein. While the embodiments shown in FIGS. 1 and 2 are considered to be presently preferred embodiments, any of the embodiments shown herein may be suitable depending upon a variety of design factors including cost, development schedule, complexity, etc. Additional embodiments are contemplated within the spirit and scope of the appended claims.

Processor 10 is shown in FIG. 1 coupled to an optional L2 cache 38. L2 cache 38 is referred to as a "backside L2", as the cache is coupled to processor 10 via a private interface separate from CPU bus 34. L2 cache 38 may be larger than any internal caches employed within processor 10 and may be used to store data for more rapid access than that achievable from main memory 14.

As used herein, the term "processor" refers to at least the hardware for executing instructions defined by a particular instruction set architecture. Accordingly, the processor cores shown in FIG. 2 below qualify as processors under the present definition. Processors may include additional hardware as desired.

Bus bridge 12 provides an interface between processor 10, main memory 14, graphics controller 18, and devices attached to PCI bus 24. When an operation is received from one of the devices connected to bus bridge 12, bus bridge 12 identifies the target of the operation (e.g. a particular device or, in the case of PCI bus 24, that the target is on PCI bus 24). Bus bridge 12 routes the operation to the targeted device. Bus bridge 12 generally translates an operation from the protocol used by the source device or bus to the protocol used by the target device or bus. In one embodiment, CPU bus 34 comprises an EV6 bus developed by Digital Equipment Corporation and bus bridge 12 comprises an Alpha 21171 or 21172 core logic chipset. However, any CPU bus and suitable bus bridge may be used.

In addition to providing an interface to an ISA/EISA bus for PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired. An external cache unit (not shown) may further be coupled to CPU bus 34 between processor 10 and bus bridge 12 in other embodiments. Alternatively, the external cache may be coupled to bus bridge 12 and cache control logic for the external cache may be integrated into bus bridge 12.

Main memory 14 is a memory in which application programs are stored and from which processor 10 primarily executes. A suitable main memory 14 comprises DRAM (Dynamic Random Access Memory), and preferably a plurality of banks of SDRAM (Synchronous DRAM).

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14. Graphics controller 18 may therefore be a master of AGP bus 20 in that it can request and receive access to a target interface within bus bridge 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of bus bridge 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 5 may be a multiprocessing computer system including additional processors (e.g. processor 10a shown as an optional component of computer system 5, along with an optional L2 cache 38a). Processor 10a may be similar to processor 10. More particularly, processor 10a may be an identical copy of processor 10. As shown in FIG. 1, processor 10a is coupled to bus bridge 12 via a separate CPU bus 34a similar to CPU bus 34. Alternatively, processor 10a may share CPU bus 34 with processor 10.

Turning now to FIG. 2, a block diagram of a first embodiment of processor 10 is shown. Other embodiments are possible and contemplated. In the embodiment of FIG. 2, processor 10 includes a bus interface unit 40, a memory management unit (MMU) 42, an instruction cache (Icache) 44, a data cache (Dcache) 46, a host processor core 48, and an emulation coprocessor core 50. Bus interface unit 40 is coupled to CPU bus 34 and to a backside L2 interface 52 to L2 cache 38. Bus interface unit 40 is also coupled to MMU 42, which is further coupled to instruction cache 44 and to data cache 46. Both instruction cache 44 and data cache 46 are coupled to host processor core 48, and data cache 46 is coupled to emulation coprocessor core 50. Instruction cache 44 is optionally coupled to emulation coprocessor core 50, as described in further detail below. In the embodiment of FIG. 2, the elements of processor 10 are integrated onto a semiconductor substrate. A command interface 54 is coupled between host processor core 48 and emulation coprocessor core 50.

Host processor core 48 is configured to fetch instructions from instruction cache 44 and to execute those instructions. The instructions may comprise a portion of a host application program, or may comprise a portion of the operating system employed by computer system 5. One particular portion of the operating system is used to create processes, including initiating a foreign application program. If, during execution of the create process portion of the operating system, a foreign application program is detected as being initiated, host processor core 48 communicates via command interface 54 with emulation coprocessor core 50. Host processor core 48 establishes a context within emulation coprocessor core 50 corresponding to the foreign application program being initiated. Included in the context is an initial program counter address, from which the first instruction in the foreign application program is to be fetched. Once the context is established, host processor core 48 provides a command to emulation coprocessor core 50 to begin execution. Emulation coprocessor core 50 begins fetching instructions at the program counter address, and executes the instructions according to the foreign instruction set architecture. As used herein, the term "context" refers to values which are particular to a process. The context generally includes the memory pages allocated to the process, as well as register values.

Emulation coprocessor core 50 is configured to determine if a transition, within the foreign application program process, is occurring to instructions coded in the host instruction set architecture. For example, if the foreign application program calls an operating system routine, a transition is detected because the operating system is coded according to the host instruction set architecture. Additionally, exceptions and other processor events which lead to operating system code or other code using the host instruction set architecture are transitions. Upon determining that a transition is occurring, emulation coprocessor core 50 communicates via command interface 54 to host processor core 48 that emulation coprocessor core 50 has stopped. Host processor core 48 requests context information to determine the reason for stopping, and takes a corresponding action (e.g. executing the called routine or providing the operating system service). Once host processor core 48 determines that the foreign application program may be resumed, host processor core 48 provides context information (if needed) and provides the command for emulation coprocessor core 50 to start.

Command interface 54 may be implemented in a variety of fashions. For example, command interface 54 may comprise a set of hardwired signals between host processor core 48 and emulation coprocessor core 50. Command signals may be assigned to each command defined for command interface 54, as well as a bus for passing context values. Alternatively, command interface 54 may comprise FIFOs for communicating between the processor cores (i.e. one or more FIFOs for messages from host processor core 48 to emulation coprocessor core 50 and one or more FIFOs for messages from emulation coprocessor core 50 to host processor core 48). It is noted that command interface 54 may be an example of a "communication channel". Generally, a communication channel is a connection between a transmitter and a receiver over which messages can be sent. A predefined protocol may be used to define the messages transmitted via the channel. For example, hardwired signals form a communications channel and combinations of the signals are used to transmit messages. Furthermore, FIFOs may form a communications channel and the messages are encoded as FIFO entries. The FIFOs may simply be maintained as queues in memory as well.

Host processor core 48 and emulation coprocessor core 50 share instruction cache 44 and data cache 46 in the present embodiment. Host processor core 48 fetches instructions from instruction cache 44 and fetches data to be operated upon in response to the instructions from data cache 46. Emulation coprocessor core 50 also fetches data from data cache 46. Several embodiments are contemplated for an instruction source for emulation coprocessor core 50. In a first embodiment, emulation coprocessor core 50 fetches instructions from instruction cache 44, while in a second embodiment emulation coprocessor core 50 fetches instructions from data cache 46. Several factors may affect the decision of whether emulation coprocessor core 50 fetches instructions from instruction cache 44 or from data cache 46. For example, an embodiment in which emulation coprocessor core 50 executes the x86 instruction set architecture, features such as self modifying code are supported. Therefore, instruction cache 44 may snoop upon updates to data cache 46 to detect such situations. However, the host instruction set architecture may not support such features, and snooping by instruction cache 44 of data cache 46 may be unnecessary. Furthermore, host processor core 48 may access instructions to be executed by emulation coprocessor core 50 as data. For example, to provide exception services for foreign application programs executed by emulation coprocessor core 50, host processor core 48 may need to examine the instruction for which the exception occurred. Accordingly, instructions for emulation coprocessor core 50 may already be stored in data cache 46. In yet another contemplated embodiment, emulation coprocessor core 50 includes an instruction cache, and instruction cache misses are fetched from data cache 46.

Host processor core 48 and emulation coprocessor core 50 share MMU 42 in this embodiment as well. MMU 42 is configured to provide translations from the virtual addresses generated via execution of instructions in host processor core 48 and emulation coprocessor core 50 to physical addresses which bus interface unit 40 may use to read main memory 14 or L2 cache 38. Instruction cache 44 and data cache 46 may also store instructions and data according to physical addresses, in which case MMU 42 may be accessed in parallel with instruction cache 44 and data cache 46.

Generally, the host instruction set architecture and the foreign instruction set architecture define differing address translation mechanisms. MMU 42 may support the address translation mechanism defined by the host instruction set architecture and translations for both host processor core 48 and emulation coprocessor core 50 may be provided from the host address translation mechanism. If differing page sizes are defined for the host and foreign instruction set architectures, the protection portion of the translation mechanism may be augmented with additional copies of the protection information to provide independent protection on the granularity of the smaller page size, if desired. Alternatively, MMU 42 may be configured to support the address translation mechanism defined by the host instruction set architecture as well as the address translation mechanism defined by the foreign instruction set architecture. The operating system may allocate pages of memory for virtual addresses according to the address translation mechanism defined by the host instruction set architecture. Additional software, or hardware within MMU 42, may create corresponding translations using the address translation mechanism defined by the foreign instruction set architecture. Alternatively, the operating system may create address translations within the address translation mechanism of the foreign instruction set architecture as well if the page is requested by a foreign application program.

As shown in FIG. 2, host processor core 48 includes a fetch/decode unit 60, a plurality of functional units 62A–62C, an order and dependency control block 64, and a plurality of registers 66. Similarly, emulation coprocessor core 50 is shown as including a fetch/decode unit 70, a plurality of functional units 72A–72C, an order and dependency control block 74, and a plurality of registers 76. Generally, fetch/decode units 60 and 70 are configured to fetch instructions as defined by the corresponding instruction set architecture and to decode those instructions to determine which of the corresponding functional units 62A–62C and 72A–72C are configured to execute the instructions. Fetch/decode units 60 and 70 may provide the instructions to the functional units 62A–62C and 72A–72C, as well as to order and dependency control blocks 64 and 74, respectively. Order and dependency control blocks 64 and 74 ensure that instruction dependencies are detected and appropriate sources for operand values are provided for each instruction, as well as insuring that instruction execution order is properly maintained. Order and dependency control blocks of 64 and 74 may comprise, for example, a reorder buffer and related circuitry. Alternatively, order and dependency control blocks 64 and 74 may comprise any suitable circuitry for performing ordering and dependency control functions. In yet another alternative, ordering and dependency operations may be performed by fetch/decode units 60 and 70. Registers 66 and 76 are the registers defined by the corresponding instruction set architecture.

Functional units 62A and 72A are shown connected to data cache 46 in the embodiment of FIG. 2. These functional units may include memory operation (i.e. load and store) functionality. Other functional units may include memory operation functionality as well in alternative embodiments. The combination of functional units 62A–62C provide the hardware used to execute the instructions defined by the host instruction set architecture. Similarly, the combination of functional units 72A–72C provide the hardware used to execute the instructions defined by the foreign instruction set. Microcode techniques may also be employed if desired to simplify functional unit design. It is noted that, while multiple functional units are shown in each of cores 48 and 50 in FIG. 2, embodiments having more or fewer functional units are contemplated, including embodiments which have one functional unit in one or both of cores 48 and 50. Furthermore, either of cores 48 or 50 may have more functional units than the other.

It is noted that, while one emulation coprocessor core is shown in FIG. 2 (and one emulation coprocessor is shown in FIGS. 7, 9, 10, 11, and 13 below), it is contemplated that multiple emulation coprocessors may be employed. Furthermore, it is contemplated that multiple foreign instruction set architectures may be supported using multiple emulation coprocessors.

Figure 3:
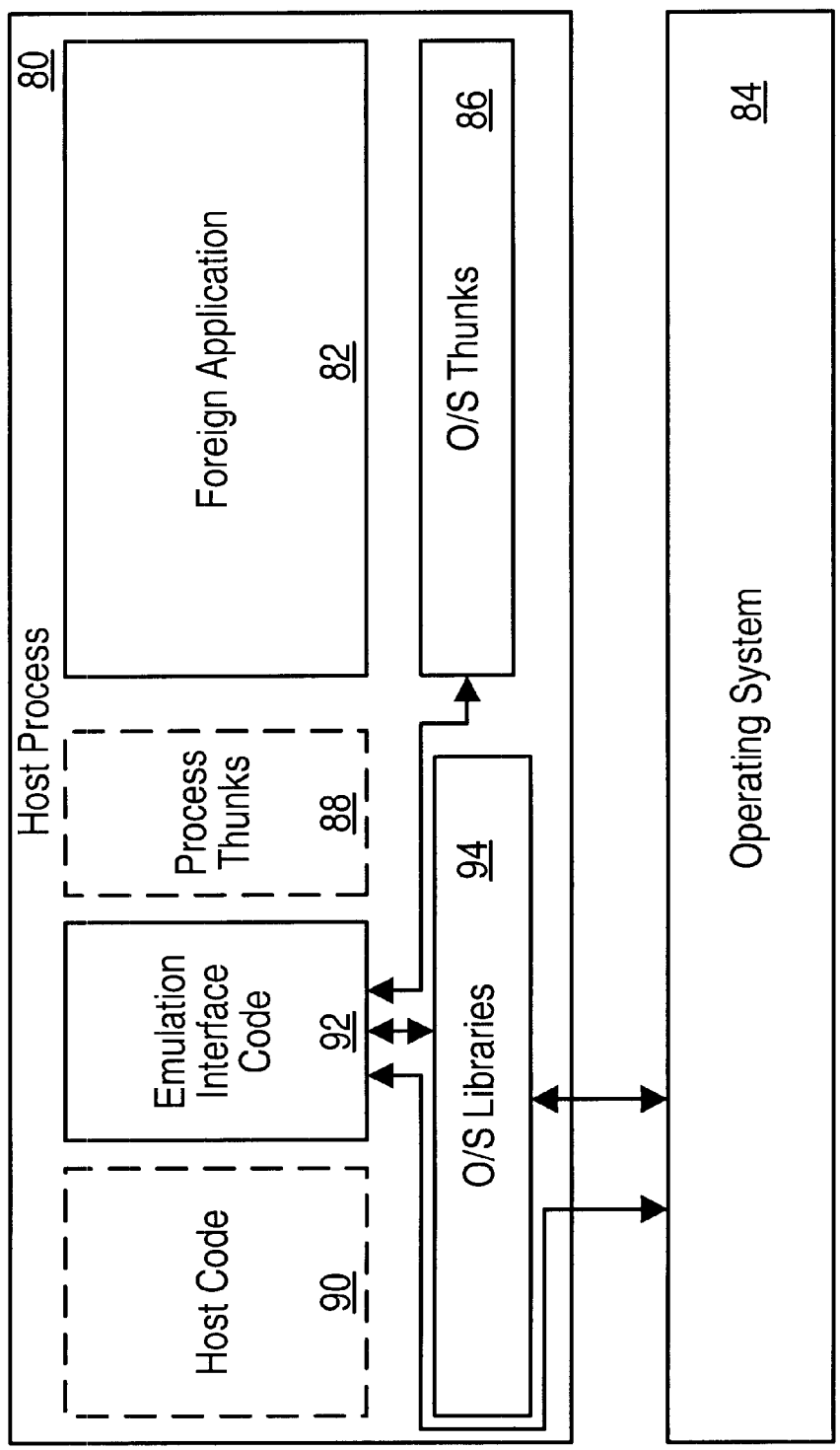
FIG. 3 is a block diagram of a process emulating a foreign application.

Turning now to FIG. 3, a block diagram of a software model employed by one embodiment of computer system 5 is shown. FIG. 3 illustrates a host process 80 including a foreign application program 82. The embodiment shown may, for example, represent the operation of the Windows NT operating system with the Alpha instruction set architecture as the host instruction set architecture and the x86 instruction set architecture as the foreign instruction set architecture. FIG. 3 may further represent other operating systems, host instruction set architectures, and foreign instruction set architectures. Other embodiments are possible and contemplated.

Foreign application 82 comprises one or more modules coded in the foreign instruction set architecture. The foreign application may include calls to operating system routines. Instead of directly calling the operating system routines, each routine is replaced by a "thunk". The thunk is a routine having the same name as the routine which it replaces (and therefore the same address within the address space of process 80). In the present embodiment, the thunk includes a particular, predefined illegal opcode, which causes the emulation coprocessor to take an illegal opcode trap (or "exception"). Upon taking an illegal opcode trap, the emulation coprocessor communicates with the host processor to indicate that the foreign application has stopped. For example, the emulation coprocessor may include hardware which generates the stop message upon taking the illegal opcode trap. Alternatively, the illegal opcode trap handler (code stored at a predetermined address defined to be fetched upon the occurrence of the illegal opcode trap) may be coded to provide the stop message. Two sets of thunks are shown in FIG. 3, operating system thunks 86 and process thunks 88. Operating system thunks 86 are used to intercept operating system calls, both direct operating system calls coded into the foreign application program 82 and indirect operating system calls which occur as response to exceptions during execution of foreign application program 82. Additionally, process thunks 88 may be included for communicating with a block of host code 90 included in the process. However, process thunks 88 and host code 90 are optional. The aforementioned process can be used to detect the transitions between foreign application code and host code. Other embodiments may employ other methods for detecting the transition.

Host process 80 further includes emulation interface code 92 which may be used to communicate between the host processor and the emulation coprocessor. Accordingly, operating system thunks 86 may lead to invocation of emulation interface code 92 to pass messages between the host processor and emulation coprocessor. Furthermore, the host processor may be configured to request context information from the emulation coprocessor using emulation interface code 92. While the operating system routines being called by foreign application program 82 and corresponding operating system routines provided by operating system 84 provide the same function, the calling conventions (i.e. the manner in which parameters are passed between the application and the operating system routine) are different because the instruction set architectures are different. For example, the number and type of registers differ, and therefore the ability to pass parameters within the registers (as opposed to memory locations) differs. Accordingly, emulation interface code 92 may request the context values which are the parameters for the call, and may place the parameters in the corresponding registers on the host processor. The operating system call may then be performed by the host processor. Subsequently, the results of the operating system routine may be placed into the emulation coprocessor by reversing the conversion of calling conventions.

Still further, operating system library code 94 may be included in host process 80. For example, dynamic load libraries defined in the Windows NT operating system may be resolved via operating system libraries 94.

Figure 4:
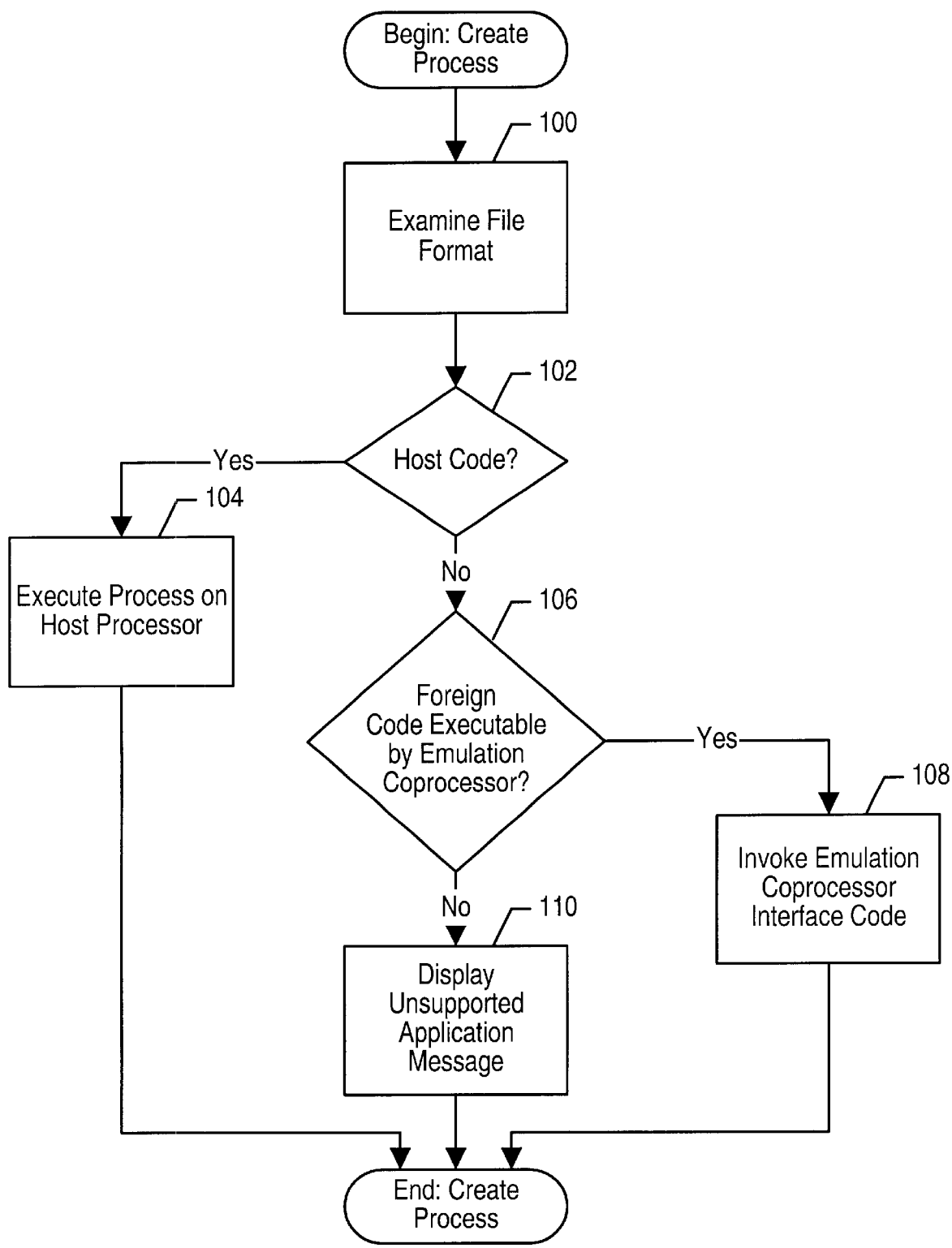
FIG. 4 is a flowchart illustrating one embodiment of the initialization of an application program in the computer system shown in FIG. 1.

Turning next to FIG. 4, a flowchart is shown illustrating initialization of an application program according to one embodiment of the computer system shown in FIG. 1. Other embodiments are possible and contemplated. While several steps may be shown in FIG. 4 in a serial order for ease of understanding, any suitable order may be used. Furthermore, steps may be performed in parallel as desired.

Upon receiving a command from a user to initiate an application program, the operating system creates a process in which the application program executes. The operating system examines the file format of the application program to determine what type of code is included in the application program (step 100). For an embodiment employing the Windows NT operating system, for example, the portable execution format includes an indication of which instruction set architecture the application program is coded for. The portable execution format is defined as part of application programming interface defined by Windows NT.

If the application program is determined to be coded according to the host instruction set architecture (decision block 102), the operating system establishes the process to as a normal host process and the application program is executed by the host processor (step 104). On the other hand, if the application program is determined not to be coded according to the host instruction set architecture, the operating system determines if the application program is coded according to a foreign instruction set architecture which is executable by an emulation coprocessor within the computer system (decision block 106). If the foreign instruction set architecture is executable by the emulation coprocessor, the operating system invokes the emulation coprocessor interface code in order to initiate the foreign application program upon the emulation coprocessor (step 108). If the foreign instruction set architecture is not executable by the emulation coprocessor, the operating system displays a message to the user indicating that the application is unsupported (step 110). The application program is not started in this case. Alternatively, software emulation or binary translation of the application may be provided at step 110 if desired. For example, a scheme similar to Digital Equipment Corporation's FX!32 product or Microsoft's Wx86 product may be employed.

Figure 5:
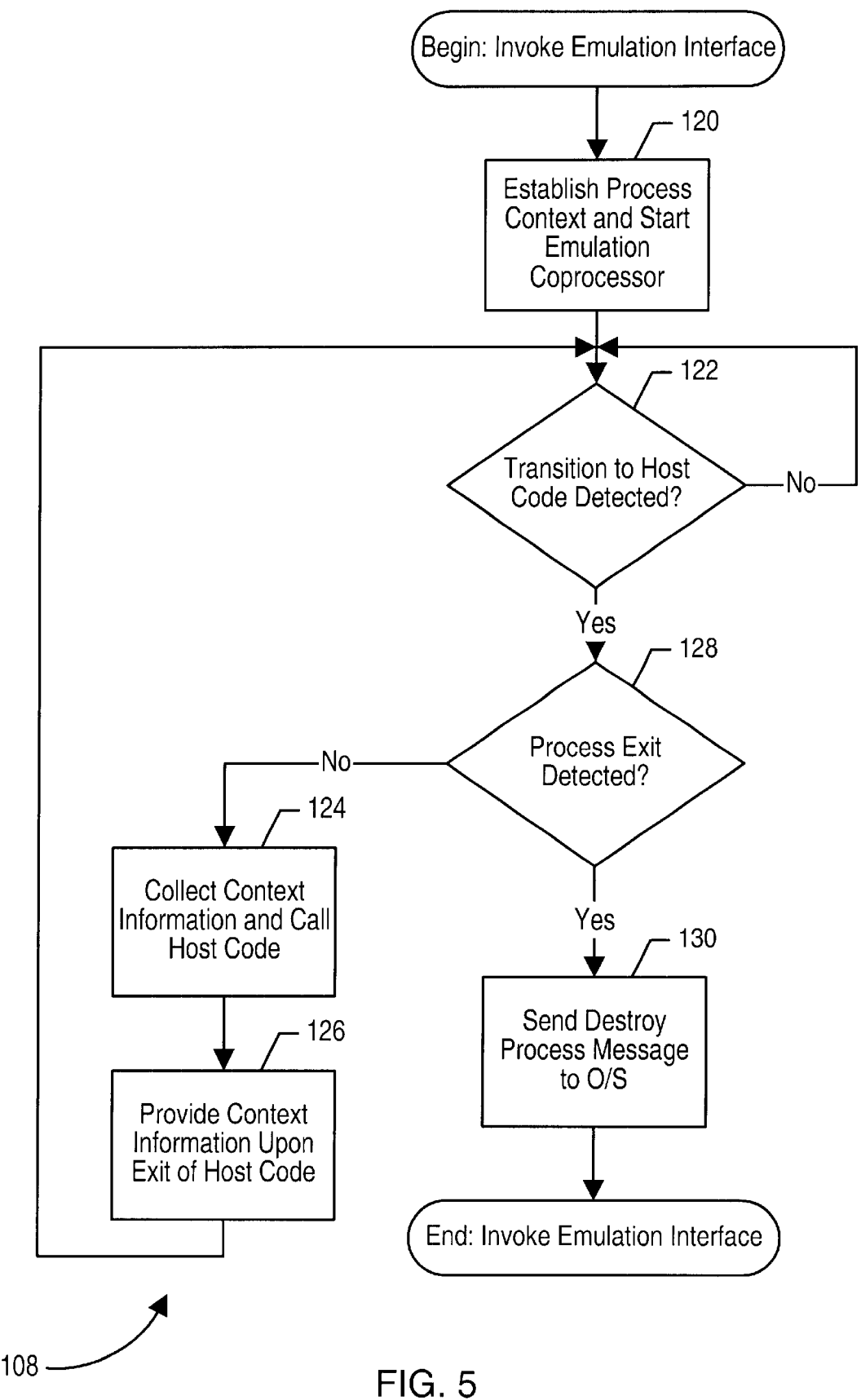
FIG. 5 is a flowchart illustrating one embodiment of invocation of an emulation interface shown in FIG. 3.

Turning next to FIG. 5, a flowchart is shown illustrating one embodiment of invocation of an emulation interface shown in FIG. 3 (e.g. step 108 shown in FIG. 4). Other embodiments are possible and contemplated. The process context is established by the host processor (using commands transmitted via the command interface between the host processor and the emulation coprocessor). Initial values for the registers are provided, including a value for the program counter register which is the virtual address of the first instruction in the application program. After establishing the context, the "go" (i.e. start executing) command is given to the emulation coprocessor (step 120).

The emulation interface code, executing upon the host processor, monitors command interface 54 to receive a message from the emulation coprocessor indicating that a transition to host code has been detected (i.e. a stop message is received from the emulation coprocessor). If a transition to host code is detected (decision block 122), the host processor determines if the transition is due to a process exit condition (decision block 128). As will be illustrated below in FIG. 6, the stop command may include an indication of the reason for stopping. If a process exit is detected, a destroy process message is sent to the operating system and the emulation interface code exits (step 130).

On the other hand, if a process exit is not detected, the host processor collects context information, via command interface 54, to determine which operating system routine is to be executed and what the calling parameters are (step 124). The host code is then executed upon the host processor. Context information is provided, via command interface 54, to the emulation coprocessor. Results provided via execution of the operating system routine may be passed, if applicable, to the emulation coprocessor in this fashion. The go command is then provided to cause the emulation coprocessor to continue (step 126), and the host processor continues to monitor for messages from the emulation coprocessor.

It is noted that there are at least two types of operating system routines which may be called by the foreign application program. The first type is an operating system library routine call intentionally coded into the foreign application program. Library routines provide low level services which may be used by many application programs, and are used by the application program instead of coding the service themselves. Typically, the library routines and parameters used by the routines are documented for the application developer's use. Additionally, operating system routines which provide exception handling may be called. As implied in the name, these routines are "called" when the emulation coprocessor detects an exception. For example, page faults occurring when an instruction fetch address or data address fails to translate invoke an exception routine to allocate a page.

Page faults may occur upon the initial access to a particular page. For example, when the emulation coprocessor attempts to fetch the first instruction of an application program, the page including the first instruction may not yet be allocated to the application program. Accordingly, the fetch address does not translate and a page fault occurs. Similarly, each time data is accessed from a new page, a page fault may occur. Page faults may also occur if the page is "paged out" to disk to allow a different page to be allocated.

It is noted that the flowchart of FIG. 5 may be interrupted under a preemptive multitasking operating system such as Windows NT to allow the host processor to execute other tasks (e.g. a host application program or an operating system routine unrelated to the application being executed). Furthermore, if multiple foreign applications are executing concurrently, multiple processes may be monitoring for messages.

In one embodiment, the emulation interface code may interface to the Wx86 extension to the Windows NT operation system.

Turning now to FIG. 6, a table 140 is shown illustrating the commands supported by one embodiment of command interface 54. Other embodiments employing different commands, or combinations of different commands and one or more commands shown in table 140, are contemplated.

A read registers command is supported for reading emulation coprocessor registers by the host processor. The emulation coprocessor responds to the read registers command by providing the requested register values. It is noted that memory values may be read from the emulation coprocessor's context as well. However, since the emulation coprocessor and the host processor share the same physical memory, the host processor may read the memory values directly. As mentioned above, either the same translations are shared by both the host processor and the emulation coprocessor, or translations are created according to both the host processor's instruction set architecture and the emulation coprocessor's instruction set architecture for each page allocated to a foreign application program. Accordingly, the host processor may view memory allocated to the foreign application's context.

Similarly, a write registers command is supported to allow the host processor to update registers within the emulation coprocessor. The emulation coprocessor receives data provided in the write registers command and updates the specified register with the received value. Similar to the above comments regarding reading memory, the host processor may update memory in the emulation coprocessor's context as well.

The go command indicates to the emulation coprocessor that the emulation coprocessor should begin execution. Prior to sending the go command to the emulation coprocessor, an execution pointer is stored into the program counter register in the emulation coprocessor. The emulation coprocessor, upon receiving the go command, begins fetching and executing instructions at the execution pointer. Alternatively, the execution pointer may be communicated within the go command, if desired.

A stop command is transmitted by the emulation coprocessor upon determining that an architectural switch is to be performed due to the execution of the foreign application program (e.g. host code is to be executed). The stop command informs the host processor that the emulation coprocessor has stopped, and provides the reason for the stoppage as well. A variety of reasons for stoppage may be employed as desired. For example, reasons for stoppage may include: (i) executing a thunk (as described above) for an operating system call; (ii) detecting the end of execution of the foreign application program; or (iii) experiencing an exception during execution of the application program. If desired, using read registers commands and reading the foreign application program's memory, the host processor may collect additional context information.

It is noted that the term "messages" may be used herein to refer to communications between the host processor and the emulation coprocessor. It is intended that the term messages and commands be synonymous in this disclosure.

Figure 7:
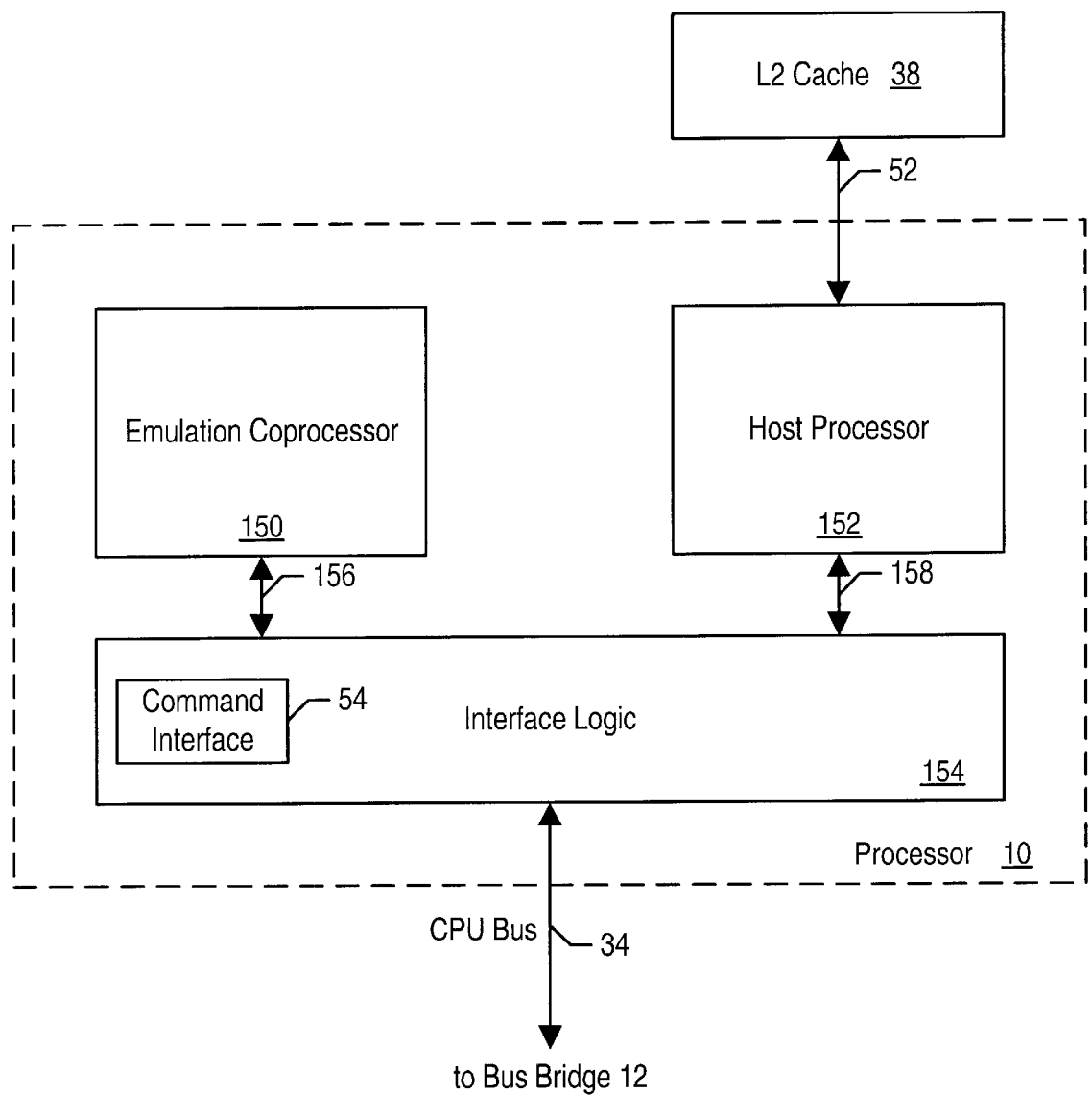
FIG. 7 is a block diagram of a second embodiment of the processor shown in FIG. 1.

Turning next to FIG. 7, a second contemplated embodiment of processor 10 is shown. The embodiment of FIG. 7 may be employed, for example, in the embodiment of computer system 5 shown in FIG. 1. FIGS. 3–6 may generally apply to the embodiment of FIG. 7 as well. Other embodiments are possible and contemplated. As shown in FIG. 7, processor 10 includes an emulation coprocessor 150, a host processor 152, and an interface logic unit 154. Emulation coprocessor 150 and host processor 154 are coupled to interface logic unit 154, which is further coupled to CPU bus 34. Host processor 152 is further coupled to L2 cache 38 via backside L2 interface 52.

Emulation coprocessor 150 may include emulation coprocessor core 50 similar to that shown in FIG. 2, as well as caches similar to instruction cache 44 and data cache 46 and an MMU similar to MMU 42. Host processor 152 may include host processor core 48 similar to that shown in FIG. 2, as well as caches similar to instruction cache 44 and data cache 46 and an MMU similar to MMU 42.

According to one particular embodiment, processor 10 as shown in FIG. 7 comprises three separate semiconductor chips attached to a printed circuit board. The printed circuit board may include an edge connector and be encapsulated for inclusion in computer system 5. For example, processor 10 may be designed in accordance with any of the slot 1, slot A, or slot 2000 specifications developed by Intel and Advanced Micro Devices. One chip embodies emulation coprocessor 150. A second chip embodies host processor 152, and a third chip embodies interface logic 154. For example, emulation coprocessor 150 and host processor 152 may be custom designed semiconductor chips and interface logic unit 154 may be an application specific integrated circuit (ASIC), a field programmable gate array (FPGA), etc. Other organizations are possible and contemplated, including realizing interface logic unit 154 as a custom semiconductor chip as well.

The embodiment shown in FIG. 7 allows for a previously designed emulation coprocessor 150 and host processor 152 (possibly manufactured using different semiconductor fabrication processes) to be used to form processor 10. Emulation coprocessor 150 and host processor 152 may each provide a bus interface to interface logic unit 154 (reference numerals 156 and 158, respectively). For example, bus interfaces 156 and 158 may be logically and electrically identical to CPU bus 34. Alternatively, bus interfaces 156 and 158 may operate according to different bus protocols and/or electrical specifications than those specified for CPU bus 34. Still further, bus interface 156 may differ from bus interface 158, and interface logic unit 154 may translate transactions upon the buses to the appropriate protocol similar to the operation of bus bridge 12.

Interface logic unit 154 provides the command interface functionality (e.g. command interface 54) in the embodiment of FIG. 7. Predefined bus cycles dissimilar from memory and I/O bus cycles may be defined upon bus interfaces 156 and 158 to communicate the various commands between emulation coprocessor 150 and host processor 152. Alternatively, command interface 52 may comprise a set of FIFOs into which emulation coprocessor 150 and host processor 152 write commands and from which emulation coprocessor 150 and host processor 152 read commands.

Figure 8:
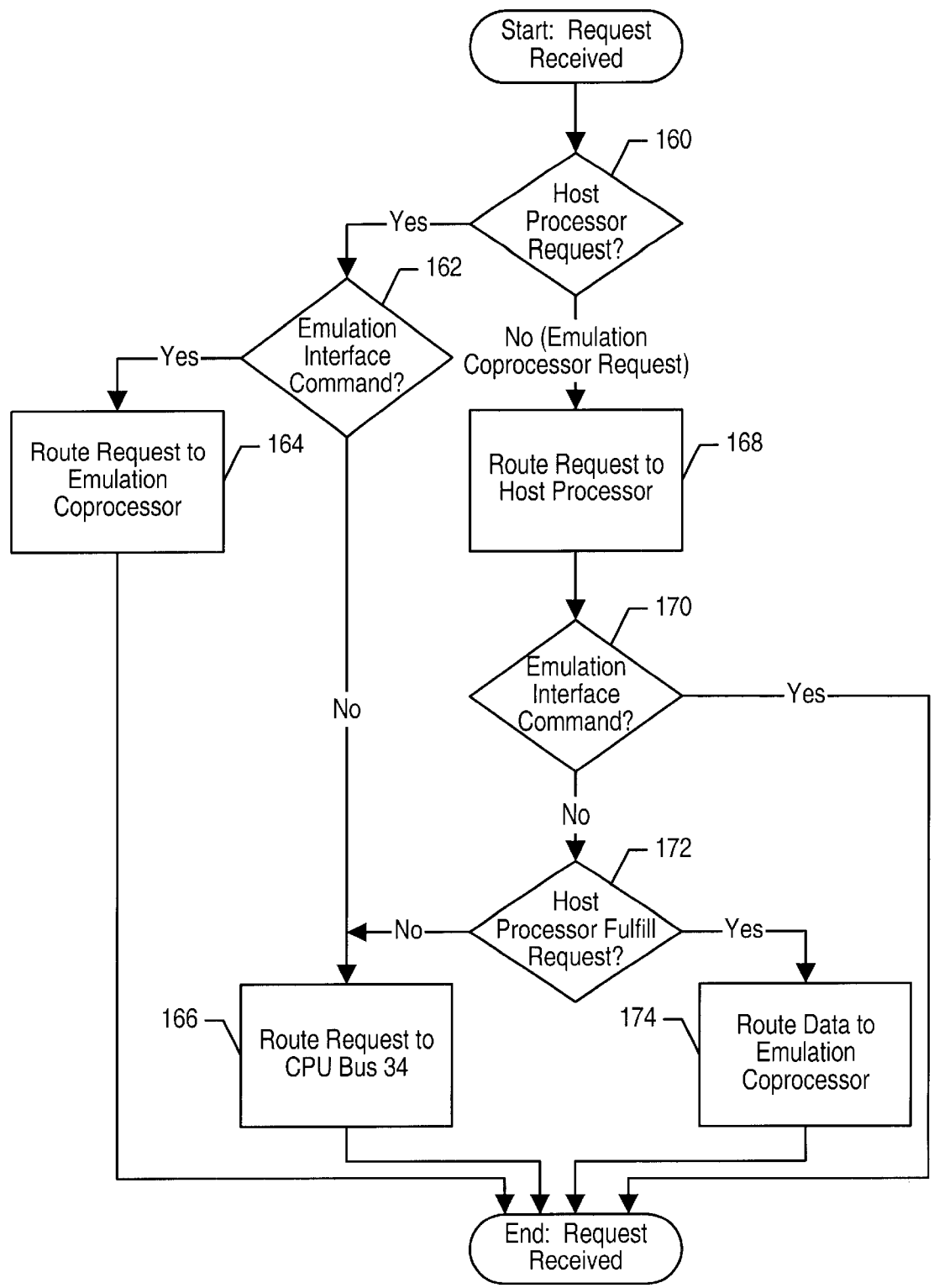
FIG. 8 is a flowchart illustrating operation of one embodiment of an interface logic block shown in FIG. 7.

In addition to providing the command interface functionality, interface logic unit 154 routes non-command (e.g. memory and I/O) requests from emulation coprocessor 150 and host processor 152 to CPU bus 34 and optionally to the non-requesting 15 processor. FIG. 8 is a flowchart illustrating one embodiment of the routing of both command and non-command requests according to one embodiment of interface logic unit 154. Other embodiments are possible and contemplated. The steps shown in FIG. 8 are sometimes illustrated in a serial order for ease of understanding. However, the steps may be performed in any suitable order and may be performed in parallel as desired.

Requests (except for coherency requests upon CPU bus 34, which are routed to both host processor 152 and emulation coprocessor 154) are either initiated by host processor 152 or by emulation coprocessor 150. If a request is received upon bus interface 156, the request is initiated by emulation coprocessor 150. If the request is received by host processor 158, then the request is initiated by host processor 152. Interface logic unit 154 determines the initiator of the request (decision block 160). If the request is initiated by host processor 152, then interface logic unit 154 determines if the request is a command for the emulation interface (e.g. a command to emulation coprocessor 150 via command interface 54—decision block 162). If the request is a command to emulation coprocessor 150, the request is routed to the emulation coprocessor 150 (step 164). CPU bus 34 may be unaffected by the command. If the request is not a command to emulation coprocessor 150, interface logic unit 154 routes the command to CPU bus 34 (step 166).

On the other hand, if a request is received from emulation coprocessor 150, the request is routed to host processor 152 (step 168). Emulation interface commands are routed to host processor 152 because the destination of the request is host processor 152. Memory and I/O requests are routed to host processor 152 to allow emulation coprocessor 150 to share host processor 152's L2 cache resources (e.g. L2 cache 38). The memory request may be provided by interface logic unit 154 in the form of a coherency request, such that host processor 152 provides the requested data. Alternatively, interface logic unit 154 may employ a predefined bus cycle different from the bus cycles provided according to bus interface 158 to request a read of L2 cache 38. In this fashion, cost savings may be achieved by employing a shared L2 cache between host processor 152 and emulation coprocessor 150.

As mentioned above, the request from emulation coprocessor 150 may be either a command for the emulation interface (e.g. a command to host processor 152 via command interface 54 or a predefined bus cycle—decision block 170) or a memory or I/O request. If the request is an emulation interface command, the request may be routed to host processor 152 (step 168) and additional actions may not be needed. On the other hand, if the request is not an emulation interface command, interface logic unit 154 determines from the response of host processor 152 to the bus cycle routed thereto (step 168) to determine if the request can be satisfied by host processor 152 (decision block 172). If the request can be satisfied by host processor 152, the data provided by host processor 152 is routed to emulation coprocessor 150 via interface logic unit 154 (step 74). If the request cannot be satisfied by host processor 152, the request is routed to PU bus 34 by interface logic unit 154 (step 166).

Figure 9:
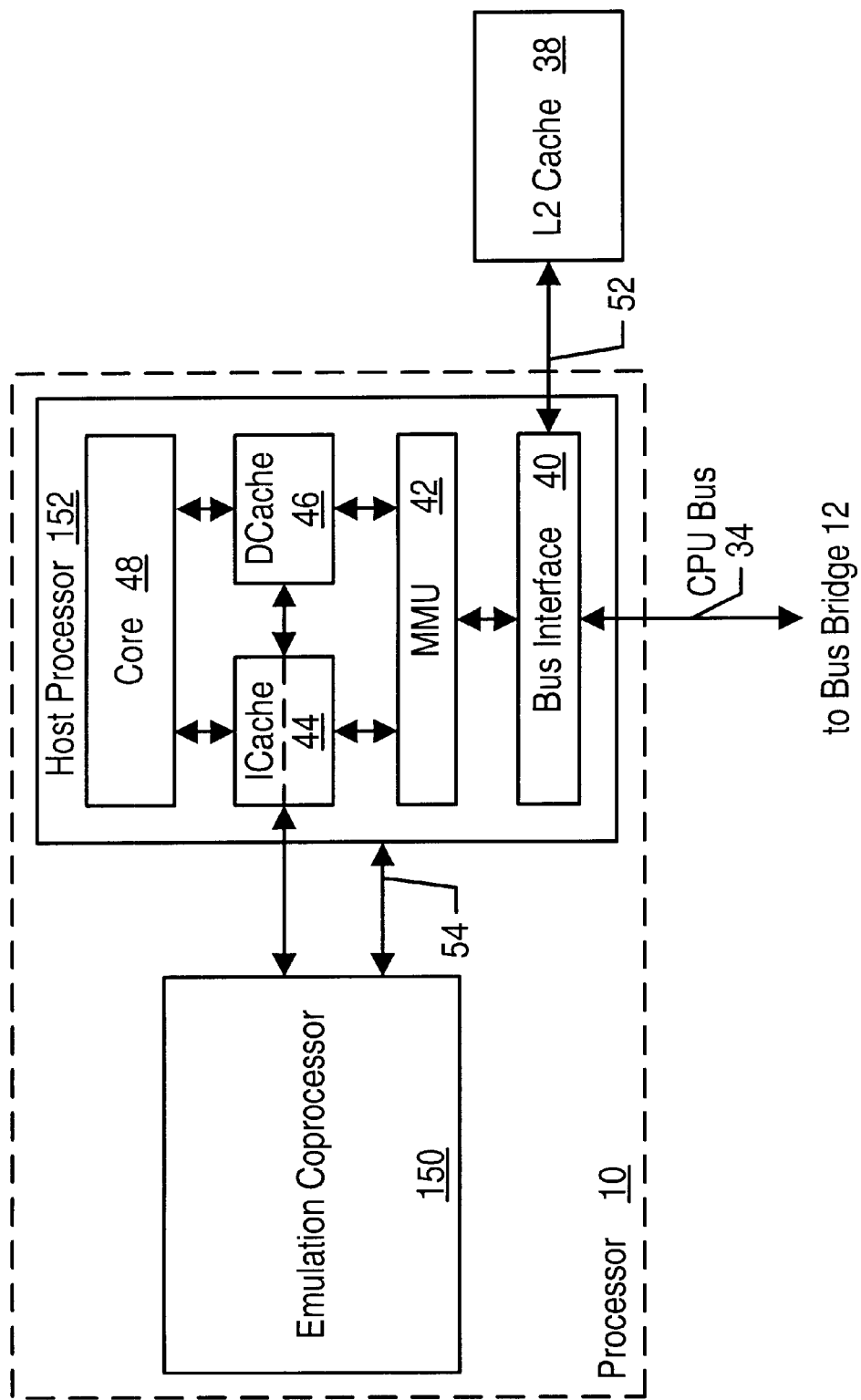
FIG. 9 is a block diagram of a third embodiment of the processor shown in FIG. 1.

Turning next to FIG. 9, a block diagram of a third embodiment of processor 10 is shown which may be employed in computer system 5 shown in FIG. 1, for example. FIGS. 3–6 may generally apply to this embodiment as well. Other embodiments are possible and contemplated. In the embodiment of FIG. 9, processor 10 includes emulation coprocessor 150 and host processor 152. Host processor 152 shown in greater detail, including a core 48, Icache 44, Dcache 46, MMU 42, and bus interface unit 40. Emulation coprocessor 150 is coupled to host processor 152 via connections internal coprocessor 10, including command interface 54. Host processor 152, and more particularly bus interface unit 40, is coupled to CPU bus 34 and to L2 cache 38 via back side L2 interface 52.

The embodiment of FIG. 9 allows for the sharing of cache and MMU resources between emulation coprocessor 150 and host processor 152. In other words, emulation coprocessor 150 may exclude caches and MMU circuitry in this embodiment. Instead, emulation coprocessor 150 may be provided with access to Icache 44, Dcache 46, MMU 42, and indirectly bus interface unit 40. Advantageously, the amount of circuitry employed to realize emulation coprocessor 150 may be reduced substantially.

It is noted that emulation coprocessor 150 may be configured to fetch instructions from either data cache 46 or instruction cache 44, in various embodiments, similar to the above description of FIG. 2. Still further, emulation coprocessor 150 may include an instruction cache for fetching instructions and may fetch instruction cache misses from data cache 46.

As an alternative to providing command interface 54 within processor 10, FIFOs may be maintained within main memory 14 to pass command messages between host processor 152 and emulation coprocessor 150. It is noted the embodiment of FIG. 9, processor 10 may be realized as a single semiconductor substrate, a multichip module, or two or more semiconductors within a slot 1, slot A., or slot 2000 type package, among others.

Figure 10:
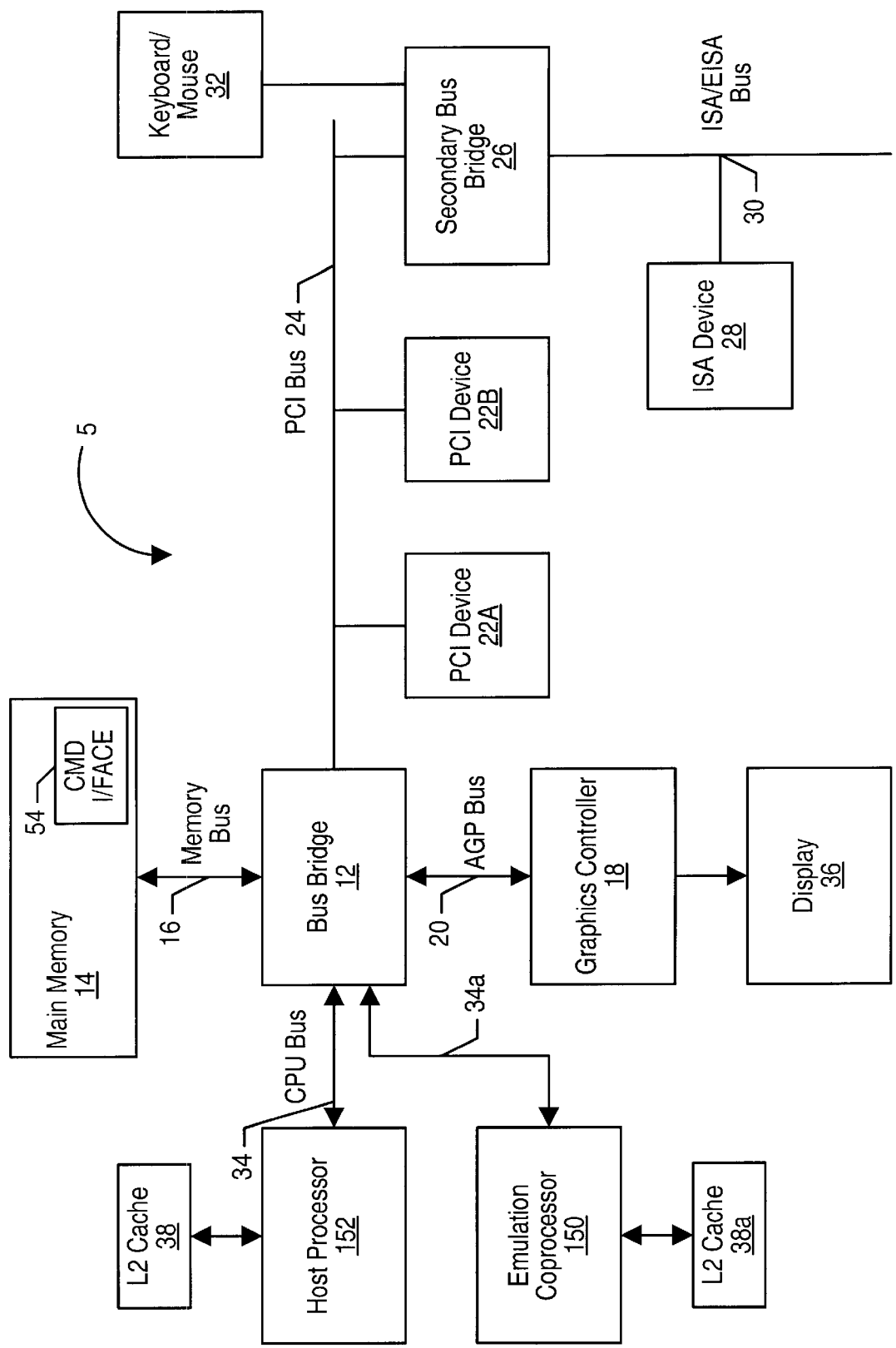
FIG. 10 is a block diagram of a second embodiment of a computer system.

Turning next to FIG. 10, a block diagram of the second embodiment of computer system 5 is shown. FIGS. 3–6 may generally apply to this embodiment as well. Other embodiments are possible and contemplated. In embodiment of FIG. 10, host processor 152 and emulation coprocessor 150 are each coupled directly to bus bridge 12. As an alternative to the independent CPU bus connections 34 and 34*a*, host processor 152 and emulation coprocessor 150 may share a common CPU bus 34. Furthermore, host processor 152 is coupled to L2 cache 38 and emulation coprocessor 150 is similarly coupled to L2 cache 38*a*.

In the embodiment of FIG. 10, host processor 152 and emulation coprocessor 150 may each include internal cache and memory management facilities. For example, host processor 152 may be a processor designed to be included in a computer system without an emulation coprocessor, and similarly, emulation coprocessor 150 may be a processor designed to be included in a computer system without a host processor (e.g. as the central processing unit of the computer system). In other words, host processor 152 and emulation coprocessor 150 may be "off-the-shelf" parts. Command interface 54 may be provided via main memory 14, such as using FIFOs to pass command messages between the processors. Alternatively, command interface 54 may be provided within bus bridge 12. As yet another alternative, a private interface separate from CPU buses 34 and 34*a* may be used to provide command interface 54.

Figure 11:
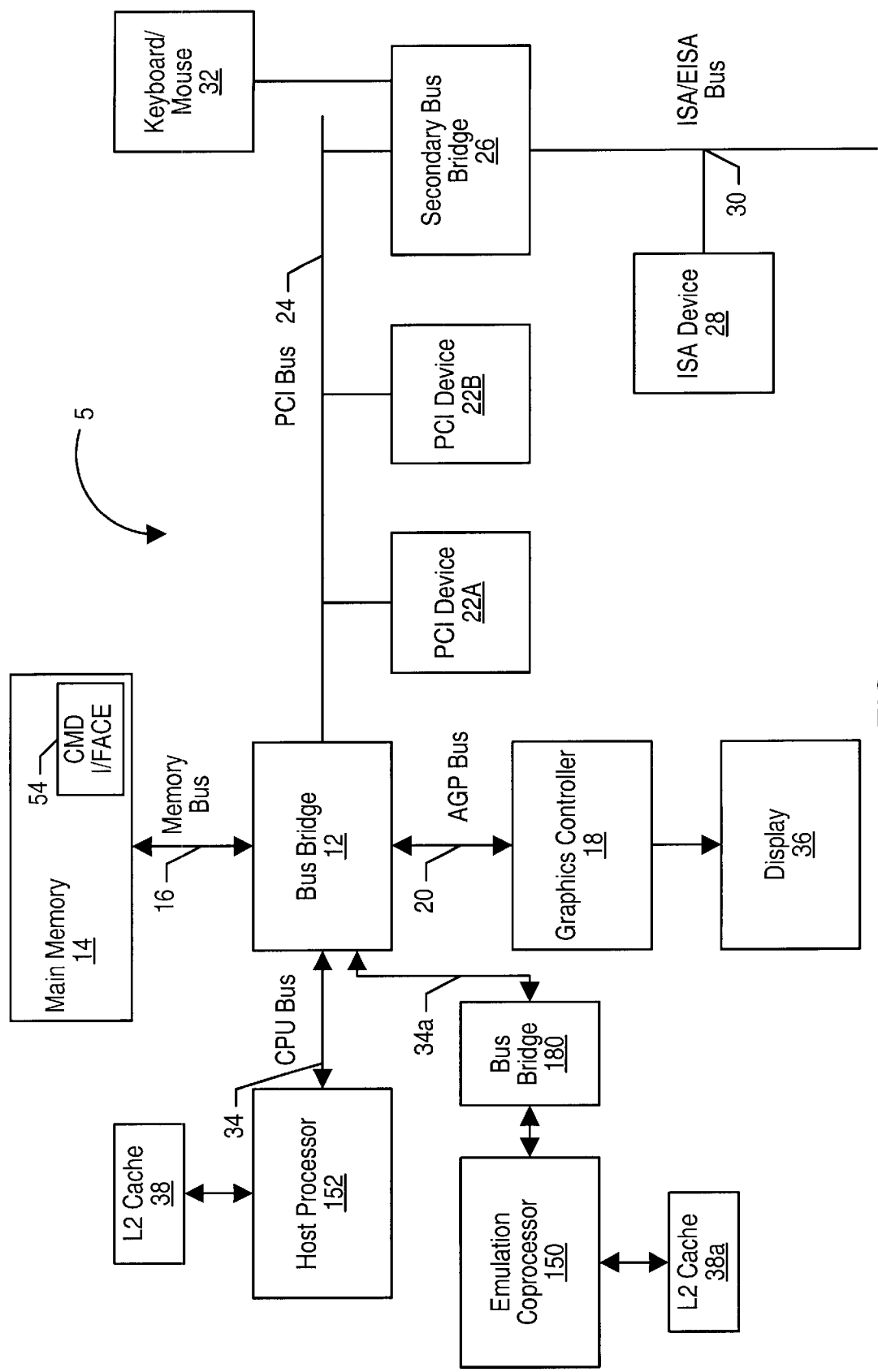
FIG. 11 is a block diagram of a third embodiment of a computer system.

In embodiment of FIG. 10, host processor 152 and emulation coprocessor 150 include a logically and electrically equivalent bus interface (i.e. CPU bus 34). FIG. 11 is another embodiment of computer system 5 in which emulation coprocessor 150 includes a different bus interface than CPU bus 34. Accordingly, computer system 5 is shown in FIG. 11 includes a bus bridge 180 for translating transactions generated by emulation coprocessor 150 from the protocol and electrical signalling characteristics of emulation coprocessor 150's bus interface to that of CPU bus 34*a*. Accordingly, the embodiment of FIG. 11 supports an off-the-shelf host processor 152 and an off-the-shelf emulation coprocessor 150, even if different bus interfaces are used by the host processor and emulation coprocessor.

As with the embodiment of FIG. 10, command interface 54 may be implemented in main memory in the embodiment FIG. 11. Alternatively, command interface 54 may be provided within bus bridge 12. As yet another alternative, a private interface separate from CPU buses 34 and 34*a* may be used to provide command interface 54.

Figure 12:
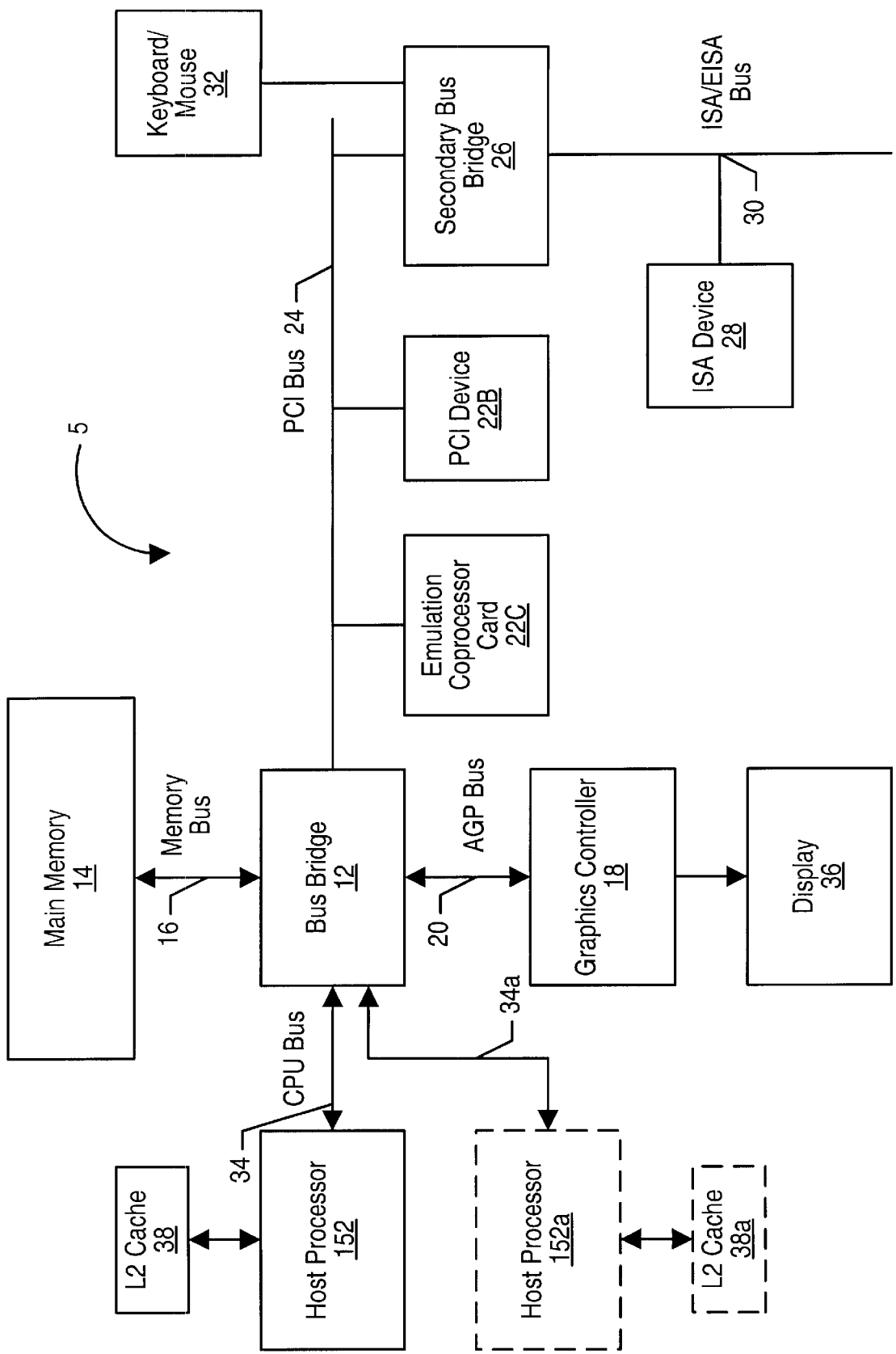
FIG. 12 is a block diagram of a fourth embodiment of a computer system.

Turning next to FIG. 12, a fourth embodiment of computer system 5 is shown. Other embodiments are possible and contemplated. In the embodiment FIG. 12, the emulation coprocessor is included on an emulation coprocessor card 22C. Emulation coprocessor card 22C is coupled to PCI bus 24 as shown in FIG. 12. The hardware for emulation coprocessor card 22C may, for example, be the Radius Detente AX or MX cards manufactured by Reply Corporation of Sunnyvale, California.

In addition to the operation described above with respect to FIGS. 3–6, the embodiment of FIG. 12 may include several other operations as well. The command interface may be maintained within memory upon emulation coprocessor card 22C. Additionally, because emulation coprocessor card 22C is an I/O device, a driver is provided within the operating system for interfacing to emulation coprocessor card 22C. Still further, a software executive is provided for emulation coprocessor card 22C to allow for multiple application programs to be concurrently in execution. Accordingly, commands to create and destroy processes and threads within the processes may be added to the set of commands which may be communicated between the emulation coprocessor and the host processor as illustrated in FIG. 6. Additionally, commands are provided to allocate pages for use by foreign application programs executing upon emulation coprocessor card 22C. Since the emulation coprocessor card 22C appears to be an I/O device to the operating system of computer system 5, when a page is allocated to the emulation coprocessor the page is locked into main memory 14 (i.e. the page is not selected for page out to a disk drive upon receipt of a page allocation request by the operating system). The executive executing upon the emulation coprocessor card determines when a page is no longer in use by the application programs executing on the emulation coprocessor, and provides a message to unlock a page upon determining that is no longer in use.

Furthermore, if the emulation coprocessor within emulation coprocessor card 22C includes one or more caches, the executive executing upon emulation coprocessor card 22C maintains cache coherency between the emulation processor caches and caches within host processor 150 and L2 cache 38 (and within host processor 150a and L2 cache 38a, if included). Alternatively, the caches within the emulation coprocessor may be disabled so that cache coherency is not an issue.

In one particular embodiment, computer system 5 employs the Windows NT operating system for the Alpha instruction set architecture and host processor 150 employs the Alpha instruction set architecture. Furthermore, the Windows NT operating system employed by computer system 5 includes the Wx86 emulation extensions. However, the code for emulating the x86 processor is replaced by the emulation interface code described above. The driver for emulation coprocessor card 22C provides the page locking and unlocking functionality in response to lock and unlock requests from the executive. More particularly, the executive requests a locked page for either code or data. The driver, in response to the request, uses the Windows NT memory manager application programming interface (API) calls to lock the page (i.e. prevent swapping the page to disk to allow a different virtual page to be assigned to that physical page). Subsequently, the executive may determine that the page is no longer needed for application program execution and may send an unlock message. In response, the driver uses the Windows NT memory manager API to unlock the page. Additionally, the driver is responsible for initializing the card within the operating system and mapping the memory upon the card.

The driver and executive for the embodiment of FIG. 12 are based on the packet-based DMA bus master model defined by the Windows NT operating system (more particularly, as documented in the Windows NT DDK). An adapter object is created using IoAllocateAdapterChannel. MDLs (memory descriptor lists) are created to describe the virtual to physical mapping of the pages used by the processes. Logical addresses are created with IoMapTransfer, and are provided to the emulation coprocessor upon emulation coprocessor card 22C. Mapping registers are thus created which provide translation of the logical addresses into physical addresses within main memory 14 (i.e. the host system memory). The emulation coprocessor may thereby access main memory 14 directly to fetch instructions and read/write data. In other words, the code is executed and data is accessed in place in main memory 14. These accesses may appear as DMA to the host system. Instructions and data are thereby provided to emulation coprocessor card 22C.

It is noted that, while a software executive has been described for controlling the emulation coprocessor card 22C, other embodiments are possible in which portions of the control are provided in hardware. Such embodiments are contemplated.

Figure 13:
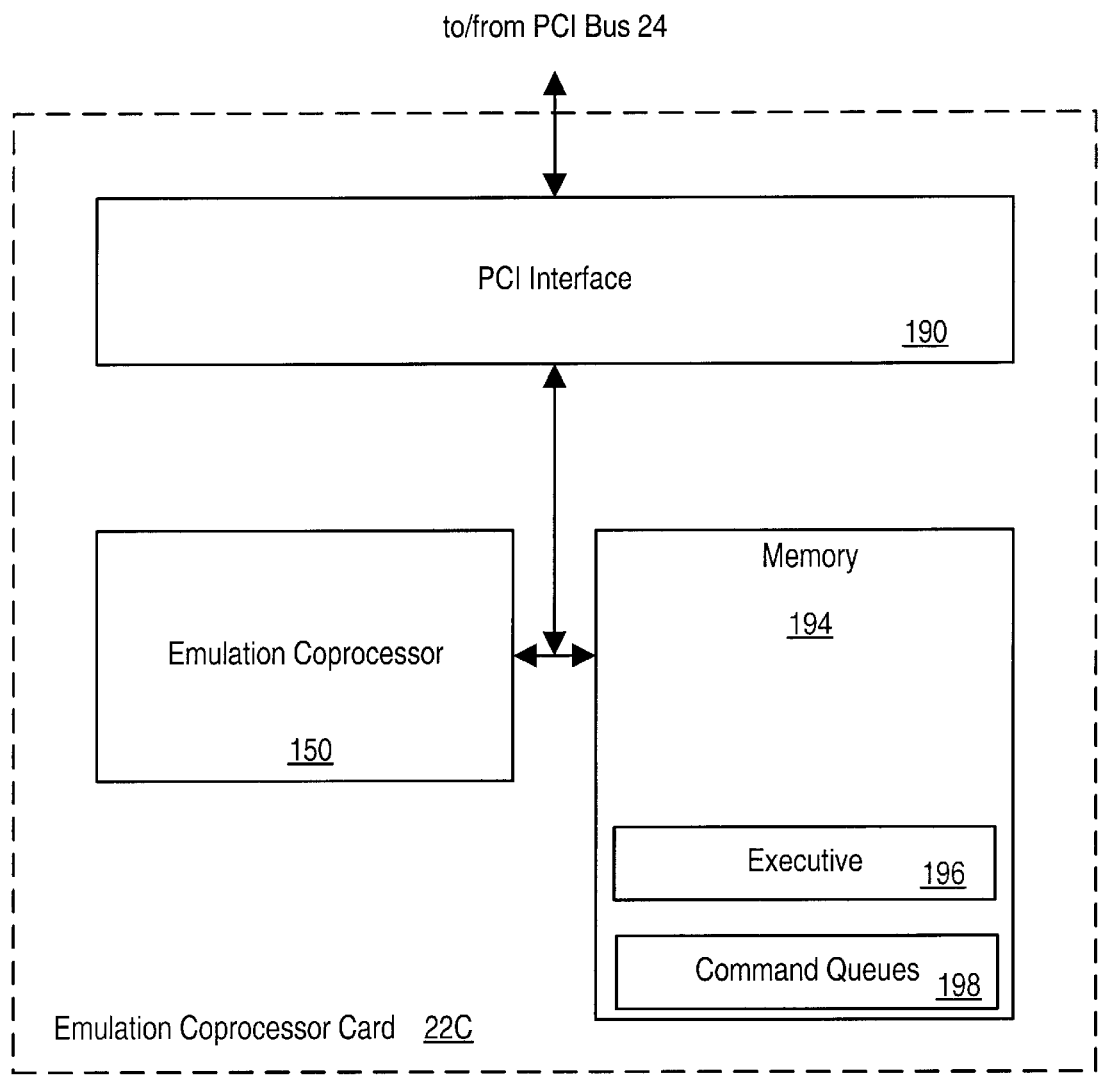
FIG. 13 is a block diagram of one embodiment of an emulation coprocessor card shown in FIG. 12.

Turning next to FIG. 13 a block diagram of one embodiment of emulation coprocessor card 22C is shown. Other embodiments are possible and contemplated. As shown in FIG. 13, emulation coprocessor card 22C includes a PCI interface 190, the emulation coprocessor 150, and a memory 194. PCI interface 190 is coupled to PCI bus 24, memory 194, and emulation coprocessor 150. Emulation coprocessor 150 is further coupled to memory 194. Memory 194 includes storage for the executive program 196 and for the command queues 198 used to pass command messages between executive program 196 and the driver for emulation coprocessor card 22C as well as emulation interface code 92. In other words, command queues 198 may comprise command interface 54. It is noted that, while instructions and data are preferably accessed from main memory 14 directly by emulation coprocessor 150, alternative embodiments may store instructions and data transferred from pages in main memory 14 in memory 194 as well.

As mentioned above, emulation coprocessor card 22C may be a Radius Detente AX or MX cards manufactured by Reply Corporation. These products may include additional hardware features not shown in FIG. 13. Hardware features may be used or not used as desired when the card is used as emulation coprocessor card 22C.

Figure 14:
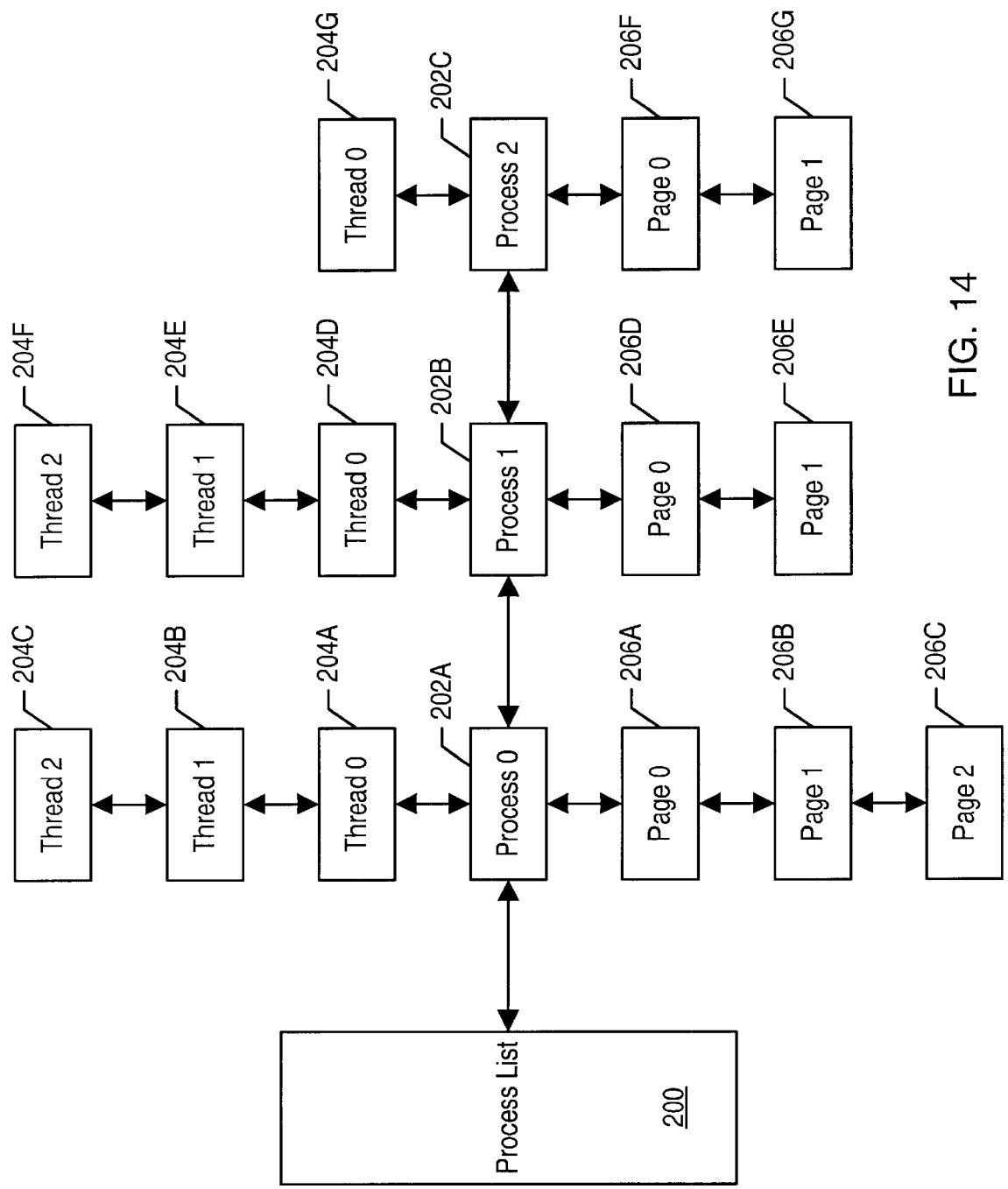
FIG. 14 is a diagram illustrating a control structure maintained by one embodiment of an executive program shown in FIG. 13.

Turning now to FIG. 14, a diagram illustrating a control structure maintained by one embodiment of executive program 196 is shown. Other embodiments are possible contemplated. In the embodiment of FIG. 14, the control structure comprises a process list 200 which is a doubly-linked list of the processes active within emulation coprocessor card 22C. For example, in FIG. 14, three processes 202A, 202B, and 202C are active. Each process may comprise one or more threads. For example, process 202A includes threads 204A, 204B, and 204C. Similarly, process 202B includes threads 204D, 204E, and 204F. Process 202C includes thread 204G. Each process may further be allocated one or more pages of memory within which instructions and data corresponding to the process are stored. For example, process 202A is allocated pages 206A, 206B, and to 206C. Similarly, process 202B is allocated pages 206D and 206E. Process 202C is allocated pages 206F and 206G.

As illustrated in FIG. 14, each process 202A–202C may be allocated different number of pages 206 and a different number of threads 204 than the other processes 202A–202C. When a process 202A–202C experiences a page fault, a new page may be allocated to that process via executive program 196 requesting a page via command queues 198. The page request includes an indication that the page is to be locked. A process 202A–202C may explicit release a page when processing within that page is completed (e.g. dynamically allocated memory), upon which executive program 196 may transmit an unlock page message. Furthermore, a page may be associated with a particular thread within the process. Such a page may be released upon exit of the thread to which the page is associated. Additionally, when a process is destroyed, the executive program 196 may transmit unlock page messages for each page assigned to that process.

Executive program 196 may maintain a global message queue within command queues 198 for create and destroy process command messages, and may maintain message queues within command queues 198 for each thread which contain command messages for that thread. In this manner, the executive program may be configured handle multiple process, multiple thread applications. The threads specific command messages may include the lock and unlock page messages as well as create and destroy messages for each thread and go and stop messages for each thread. Accordingly, process scheduling may be handled by the operating system executing upon computer system 5. The go and stop messages may be used to perform scheduling. Furthermore, the read and write registers commands shown in table 140 may be provided on a thread by thread basis as well.

Figure 15:
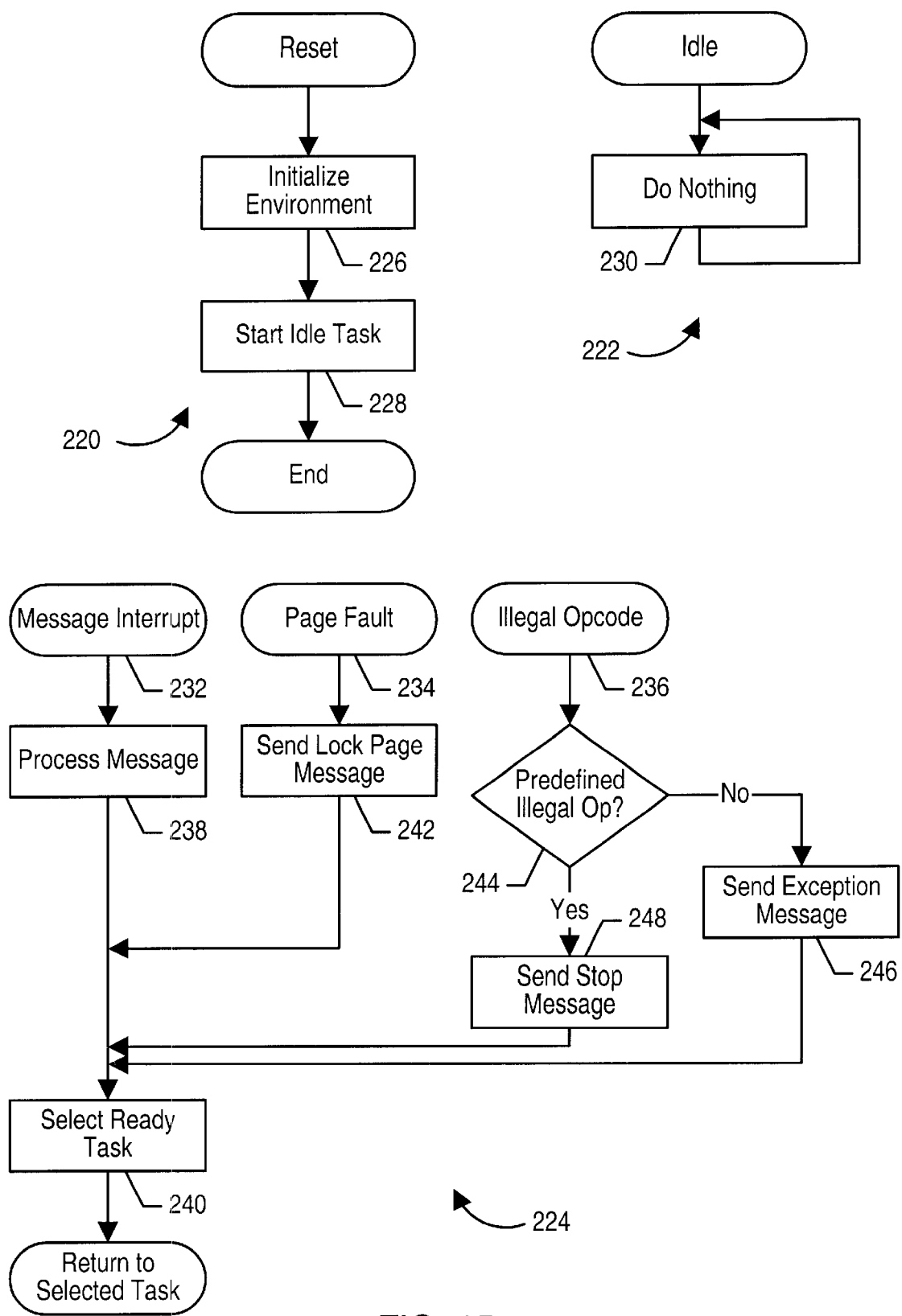
FIG. 15 is a set of flowcharts illustrating one embodiment of the executive program shown in FIG. 13.

Turning now to FIG. 15, a set of flowcharts illustrating operation of one embodiment of executive program 196 is shown. Other embodiments are possible and contemplated. In the embodiment of FIG. 15, a first flowchart 220 illustrates reset of coprocessor card 22C, a second flowchart 222 illustrates an idle process, and a third flowchart 224 illustrates other aspects of executive program 196.

Upon reset of coprocessor card 22C (e.g. upon boot of computer system 5), flowchart 220 is performed. Executive program 196 initializes its environment upon coprocessor card 22C (step 226). For example, executive program 196 may clear memory 194 to a known state, create page tables for use by emulation coprocessor 150 (and initializing entries for use by executive program 196 itself), and create command queues 198. After initializing the idle process (step 228), the reset procedure is completed. As illustrated by flowchart 222, the idle process does nothing (step 230) until interrupted (e.g. via receipt of a message in command queues 198).

Flowchart 224 illustrates operation of executive program 196 while processes are active within coprocessor card 22C. Flowchart 224 includes several entry points 232, 234, and 236 depending upon a variety of events which may cause executive program 196 to be invoked.

Entry point 232 occurs if a message is provided by the driver to command queues 198. Receipt of a message causes an interrupt of emulation coprocessor 150, at which time executive program 196 is invoked. Upon invocation due to an interrupt, executive program 196 processes the message received (step 238). A variety of messages may be received. For example, a create process or create thread message may be received. Upon receiving a create process message, executive program 196 adds a process 202 to process list 200. Similarly, upon receiving a create thread message, executive program 196 adds a thread 204 to the process 202 which received the create thread message. A read context message (e.g. a read registers command) is processed by executive program 196 by reading the register from the context data structure associated with that process (and/or thread) and generating a response message with the requested information. A write context message (e.g. a write registers command) is processed by executive program 196 by writing the value into the selected context data structure. Executive program 196 adds a thread to the list of ready tasks in response to a go message, and removes a thread from the list of ready tasks in response to a stop message. A page locked message (issued in response to a lock page message previously sent by executive program 196) is serviced by executive program 196 by updating the page tables with a translation for the locked page and adding the thread which experienced the page fault to the list of ready tasks.

After processing the message, executive program 196 selects a task from the list of ready tasks and returns to the selected task (step 240).

Entry point 234 occurs if a page fault is experienced by a task (e.g. a process thread) being executed by emulation coprocessor 150. In response to the page fault, executive program 196 sends a lock page message via command queues 198 (step 242). The task experiencing the page fault is removed from the list of ready tasks until the page locked message is received for the page. As mentioned above, receipt of the page locked message causes the task to be added to the list of ready tasks. Subsequently, executive program 196 selects a task from the list of ready tasks and returns to the selected task (step 240).

Entry point 236 occurs if an illegal opcode trap exception is experienced by emulation coprocessor 150. A predefined illegal opcode is used to signal that a thunk has been entered (sometimes referred to as a "BOP"). Executive program 196 determines if the predefined illegal opcode has been detected (decision block 244). If the predefined illegal opcode has not been detected, an exception message is sent via command queues 198 to inform the operating system that an illegal opcode exception has been received for the task generating the illegal opcode exception (step 246). If the predefined illegal opcode has been detected, a stop message is sent to inform the operating system that the ask has stopped due to a transition to host code (step 248). In either case, the task experiencing the exception is removed from the list of ready tasks and a ready task is selected from the list of ready tasks (step 240).

In accordance with the above disclosure, a computer system has been shown in which an emulation coprocessor employing one instruction set architecture is used to execute foreign application programs coded in that instruction set architecture in a computer system employing an operating system for which the foreign application programs are designed but which is coded according to a second instruction set architecture. Advantageously, the number of application programs executable by the computer system is increased. Additionally, the performance of the application programs may be substantially greater than that achievable using software emulation and/or binary translation. Still further, modeling of architectural idiosyncrasies is eliminated since the emulation coprocessor embodies the architecture. The resulting computer system forms a heterogeneous multiprocessing computer system.

Numerous variations and modifications will become apparent to those skilled in the art once the above disclosure is fully appreciated. It is intended that the following claims be interpreted to embrace all such variations and modifications.

What is claimed is:

1. An apparatus for a computer system comprising:
   a first processor configured to execute first instructions defined by a first instruction set architecture, wherein an operating system employed by said computer system is coded using said first instructions; and
   a second processor coupled to said first processor, wherein said second processor is configured to execute second instructions defined by a second instruction set architecture different than said first instruction set architecture, wherein an application program designed to execute within said operating system is coded using said second instructions;
   wherein said second processor is configured to execute said application program and said first processor is configured to execute said operating system, and wherein said second processor is configured to communicate with said first processor upon detecting a use of an operating system routine for said application program.

2. The apparatus as recited in claim 1 wherein said first processor and said second processor are coupled to one or more caches, and wherein said first processor and said second processor are configured to share said one or more caches.

3. The apparatus as recited in claim 2 wherein said first processor and said second processor are coupled to one or more memory management units, and wherein said first processor and said second processor are configured to share said memory management units.

4. The apparatus as recited in claim 3 wherein said first processor and said second processor are integrated onto a single semiconductor substrate.

5. The apparatus as recited in claim 1 wherein said first processor and said second processor are coupled to a bus bridge, and wherein said first processor is coupled to said bus bridge via a CPU bus, and wherein said second processor is coupled to said bus bridge via a peripheral bus having different signalling than said CPU bus.

6. The apparatus as recited in claim 1 wherein said second processor comprises a hardware decoder configured to decode said second instructions.

7. The apparatus as recited in claim 1 wherein said first processor and said second processor are configured to communicate via a predetermined control protocol.

8. The apparatus as recited in claim 7 wherein said control protocol comprises messages passed between said first processor and said second processor.

9. The apparatus as recited in claim 8 wherein said messages are passed through a memory within said computer system.

10. The apparatus as recited in claim 8 wherein said messages are passed through a dedicated communication channel between said first processor and said second processor.

11. A heterogeneous multiprocessing system comprising:
    a first processor configured to execute first instructions defined by a first instruction set architecture;
    a second processor coupled to said first processor, wherein said second processor is configured to execute second instructions defined by a second instruction set architecture different than said first instruction set architecture;
    an operating system coded using said first instructions; and
    an application program coded using said second instructions and designed to execute within said operating system;
    wherein said second processor is configured to execute said application program and said first processor is configured to concurrently execute a process unrelated to said application program.

12. The heterogeneous multiprocessing computer system as recited in claim 11 wherein said second processor is configured to detect a use of an operating system routine within said operating system by said application program during execution.

13. The heterogeneous multiprocessing computer system as recited in claim 12, wherein said second processor is configured to detect said use by executing a particular illegal opcode.

14. The heterogeneous multiprocessing computer system as recited in claim 12, wherein said second processor is configured to communicate with said first processor upon detection of said use.

15. The heterogeneous multiprocessing computer system as recited in claim 14 wherein said first processor is configured to request context information from said first processor, execute said operating system routine, and return control of said application program to said second processor via communication with said second processor.

16. The heterogeneous multiprocessing computer system as recited in claim 11 wherein said process unrelated to said application program comprises a second application program.

17. A method for executing an application program coded using instructions from a first instruction set architecture and designed to execute within an operating system coded using instructions from a second instruction set architecture different than said first instruction set architecture, comprising:
    detecting that said application program is being initiated, said detecting performed by said operating system executing upon a first processor configured to execute instructions from said second instruction set architecture;
    establishing a context for said application program in a second processor configured to execute instructions from said first instruction set architecture; and
    executing said application program upon said second processor.

18. The method as recited in claim 17 further comprising detecting a transition in said application program to an operating system routine within said operating system.

19. The method as recited in claim 18 further comprising executing said operating system routine upon said first processor.

20. The method as recited in claim 19 further comprising returning to said application program executing upon said second processor subsequent to said executing said operating system routine.

* * * * *